United States Patent
Li et al.

(10) Patent No.: US 10,859,867 B2
(45) Date of Patent: Dec. 8, 2020

(54) DISPLAY SUBSTRATE AND METHOD OF MANUFACTURING THE SAME, AND DISPLAY PANEL

(71) Applicant: BOE TECHNOLOGY GROUP CO., LTD., Beijing (CN)

(72) Inventors: Yingyi Li, Beijing (CN); Jian Gao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 391 days.

(21) Appl. No.: 15/750,747

(22) PCT Filed: Apr. 28, 2017

(86) PCT No.: PCT/CN2017/082420
§ 371 (c)(1),
(2) Date: Feb. 6, 2018

(87) PCT Pub. No.: WO2018/090572
PCT Pub. Date: May 24, 2018

(65) Prior Publication Data
US 2020/0089046 A1  Mar. 19, 2020

(30) Foreign Application Priority Data
Nov. 15, 2016  (CN) .......................... 2016 1 1025463

(51) Int. Cl.
*G02F 1/1335* (2006.01)
*G02F 1/1333* (2006.01)
(Continued)

(52) U.S. Cl.
CPC .. *G02F 1/133516* (2013.01); *G02F 1/133345* (2013.01); *G02F 1/133603* (2013.01); *G06F 1/1609* (2013.01)

(58) Field of Classification Search
None
See application file for complete search history.

(56) References Cited

U.S. PATENT DOCUMENTS 7,046,320 B2 * 5/2006 Hara ....................... G02B 5/285
349/105
2009/0284687 A1  11/2009 Kirita et al.
(Continued)

FOREIGN PATENT DOCUMENTS

| CN | 103676288 A | 3/2014 |
|---|---|---|
| CN | 104485429 A | 4/2015 |

(Continued)

OTHER PUBLICATIONS

First Chinese Office Action dated Jul. 3, 2017, for corresponding Chinese Application No. 201611025463.9.
(Continued)

*Primary Examiner* — J. E. Schoenholtz
(74) *Attorney, Agent, or Firm* — Kinney & Lange, P.A.

(57) ABSTRACT

Embodiments of the present disclosure provide a display substrate and a method of manufacturing the same, and a display panel including the display substrate. The display substrate includes a base substrate and an optical film layer formed on the base substrate, and the optical film layer is configured to filter out light having a wavelength in a selected wavelength range. The display substrate may be an array substrate or a color substrate.

18 Claims, 23 Drawing Sheets

(51) Int. Cl.
*G02F 1/13357* (2006.01)
*G06F 1/16* (2006.01)

(56) References Cited

U.S. PATENT DOCUMENTS

| | | | | |
|---|---|---|---|---|
| 2013/0235559 A1* | 9/2013 | Bergquist | .......... | G02F 1/133605 362/97.1 |
| 2014/0132496 A1* | 5/2014 | Hsiao | ................... | G09G 3/2003 345/107 |
| 2014/0176859 A1* | 6/2014 | Lin | ................... | G02F 1/133609 349/62 |
| 2014/0192078 A1* | 7/2014 | Gilbert | ................. | G09G 3/3426 345/590 |
| 2014/0368766 A1* | 12/2014 | Shibata | ............. | G02F 1/133617 349/61 |
| 2015/0248038 A1* | 9/2015 | Zhang | ................... | H01L 27/124 257/390 |
| 2017/0059930 A1 | 3/2017 | Wu | | |

FOREIGN PATENT DOCUMENTS

| | | | |
|---|---|---|---|
| CN | 105070728 | A | 11/2015 |
| CN | 105093377 | A | 11/2015 |
| CN | 105093685 | A | 11/2015 |
| CN | 105158963 | A | 12/2015 |
| CN | 105182595 | A | 12/2015 |
| CN | 105932038 | A | 9/2016 |
| CN | 106019444 | A | 10/2016 |
| CN | 106405921 | A | 2/2017 |
| CN | 106526949 | A | 3/2017 |
| CN | 106773226 | A | 5/2017 |
| CN | 106773260 | A | 5/2017 |
| JP | 2008262048 | A | 10/2008 |

OTHER PUBLICATIONS

Second Chinese Office Action dated Oct. 19, 2017, for corresponding Chinese Application No. 201611025463.9.
Third Chinese Office Action dated Feb. 9, 2018, for corresponding Chinese Application No. 201611025463.9.
Chinese Search Report dated May 10, 2017, for corresponding Chinese Application No. 201611025463.9.
English translation of International Search Report and Written Opinion dated Aug. 9, 2017, for corresponding PCT Application No. PCT/CN2017/082420.

* cited by examiner (A)

(B)

(C)

(D)

(A)

(B)

(C)

(D)

DISPLAY SUBSTRATE AND METHOD OF MANUFACTURING THE SAME, AND DISPLAY PANEL

This application is the national phase of PCT Application No. PCT/CN2017/082420 filed on Apr. 28, 2017, which in turn claims the benefit of Chinese Patent Application No. 201611025463.9 filed on Nov. 15, 2016 in the State Intellectual Property Office of China, the whole disclosure of which is incorporated herein by reference.

BACKGROUND OF THE DISCLOSURE

Field of the Disclosure

Embodiments of the disclosure generally relate to the field of display technologies, and in particular to a display substrate and a method of manufacturing the same, and a display panel.

Description of the Related Art

One of the functions of a display device is color reproduction. In a color reproduction technique, a color of an image may be reproduced through image processing by using a computer, and whether the color will be completely presented depends on the color gamut representation capacity of the display. The color gamut is a subset of colors, which, in a most common application, is used to accurately represent true colors in a particular environment, for example, a color space or a color rendering range of a certain output device (e.g., a display).

Generally, a liquid crystal display device is mainly made up of of a backlight module and a liquid crystal display panel, and the latter itself cannot emit light and will be necessarily provided with a light source by the backlight module. During manufacturing of the display device, in addition to general display performances (e.g., resolution, response time, contrast, brightness), it is also focused on the magnitude of a color gamut of the display device. Currently, a backlight module generally adopts a white LED (i.e., two color-mixed LED) as a light source, and a color gamut of a display device comprising such backlight module is about NTSC (a color gamut space instituted by America National Television Systems Committee) 72%.

Wide color gamut is an advanced color technique, and the international standard of the wide color gamut defines that the color coverage can reach NTSC 92%. With people's increasing demands on display devices, wide color gamut display devices become more and more popular.

SUMMARY

According to an aspect of the present disclosure, there is provided a display substrate, comprising a base substrate and an optical film layer formed on the base substrate, the optical film layer being configured to filter out light having a wavelength in a selected wavelength range.

According to some embodiments, the display substrate is an array substrate.

According to some embodiments, the optical film layer is further configured as a gate insulation layer and/or a passivation layer of the array substrate.

According to some embodiments, the array substrate further comprises a gate insulation layer and/or a passivation layer, and the optical film layer is a layer different from the gate insulation layer and/or from the passivation layer.

According to some embodiments, a material of forming the optical film layer is selected from a group consisting of materials suitable for forming the gate insulation layer and/or the passivation layer.

According to some embodiments, the display substrate is a color substrate.

According to some embodiments, a material of forming the optical film layer is selected from a group consisting of materials suitable for forming a gate insulation layer and/or a passivation layer of an array substrate which is to be assembled into a cell together with the color substrate.

According to some embodiments, the optical film layer comprises a multilayer film comprising at least two material layers which have different refractive indexes.

According to some embodiments, the multilayer film comprises first material layers having a first refractive index and second material layers having a second refractive index, the first material layers and the second material layers being alternately superposed on top of each other.

According to some embodiments, the selected wavelength range has a central wavelength of 580 nm and/or 485 nm, and a full width at half maximum in a range from 25 nm to 55 nm.

According to some embodiments, a material of forming the optical film layer is selected from a group comprising silicon nitride, silicon oxide, silicon oxynitride, amorphous silicon, polysilicon, gallium nitride, tungsten, graphene, titanium dioxide, silicon carbide, monocrystalline silicon and magnesium fluoride.

According to some embodiments, a material forming the optical film layer has a refractive index in a range of 1.2 to 4.

According to some embodiments, the number of layers of the multilayer film is in a range of 5 to 50.

According to some embodiments, the optical film layer is formed on a side of the base substrate of the array substrate facing the color substrate, and/or the optical film layer is formed on a side of the base substrate of the array substrate facing away from the color substrate.

According to some embodiments, the optical film layer is further configured as a gate insulation layer and a passivation layer of the array substrate, and the gate insulation layer and the passivation layer are in contact with each other in an opening or a display region of a pixel unit.

According to some embodiments, the optical film layer is formed on a side of the base substrate of the color substrate facing the array substrate, and/or the optical film layer is formed on a side of the base substrate of the color substrate facing away from the array substrate.

According to some embodiments, the optical film layer is located at a position corresponding to a selected primary color sub-pixel.

According to another aspect of the present disclosure, there is further provided a display panel, comprising an array substrate and a color substrate arranged opposite to each other, the array substrate being the display substrate of any of the above aspects or embodiments, and/or the color substrate is the display substrate of any of the above aspects or embodiments.

According to some embodiments, the array substrate comprises a first base substrate and a first optical film layer on the first base substrate, and the color substrate comprises a second base substrate and a second optical film layer on the second base substrate, and the first optical film layer is configured to filter out light in a selected wavelength range having a central wavelength of 580 nm and a full width at half maximum in a range from 25 nm to 55 nm, and the second optical film layer is configured to filter out light in a selected wavelength range having a central wavelength of 485 nm and a full width at half maximum in a range from 25 nm to 55 nm; or, the first optical film layer is configured to filter out light in a selected wavelength range having a central wavelength of 485 nm and a full width at half maximum in a range from 25 nm to 55 nm, and the second optical film layer is configured to filter out light in a selected wavelength range having a central wavelength of 580 nm and a full width at half maximum in a range from 25 nm to 55 nm.

According to some embodiments, the array substrate comprises a first base substrate, and a first optical film layer and a second optical film layer provided on the first base substrate, and the first optical film layer is configured to filter out light in a selected wavelength range having a central wavelength of 580 nm and a full width at half maximum in a range from 25 nm to 55 nm, and the second optical film layer is configured to filter out light in a selected wavelength range having a central wavelength of 485 nm and a full width at half maximum in a range from 25 nm to 55 nm.

According to a further aspect of the present disclosure, there is also provided a method of manufacturing a display substrate, comprising steps of:

providing a base substrate; and forming an optical film layer on the base substrate, the optical film layer being configured to filter out light having a wavelength in a selected wavelength range.

According to some embodiments, the base substrate is a base substrate of an array substrate.

According to some embodiments, the optical film layer is further configured as a gate insulation layer and/or a passivation layer of the array substrate.

According to some embodiments, the method further comprises a step of: forming a gate insulation layer and/or a passivation layer, which is different from the optical film layer, on the base substrate of the array substrate.

According to some embodiments, a material of forming the optical film layer is selected from a group consisting of materials suitable for forming the gate insulation layer and/or the passivation layer.

According to some embodiments, the step of forming an optical film layer on the base substrate comprises: forming the optical film layer on the base substrate through a deposition process.

According to some embodiments, the base substrate is a base substrate of a color substrate.

According to some embodiments, the method further comprises a step of: forming a black resin layer on the optical film layer.

According to some embodiments, the step of forming an optical film layer on the base substrate of the color substrate comprises:

forming a black resin layer on the base substrate of the color substrate;

patterning the black resin layer;

forming the optical film layer on the patterned black resin layer; and forming a transparent electrode layer on the optical film layer.

According to some embodiments, the method further comprises a step of: forming a plurality of primary color filters on the base substrate of the color substrate, and the step of forming an optical film layer on the base substrate of the color substrate comprises: forming the optical film layer on a selected primary color filter by using a mask; or the step of forming an optical film layer on the base substrate of the color substrate comprises: forming the optical film layer on all primary color filters, and etching off, by using an etching process, portions of the optical film layer on other primary color filters except the selected primary color filter so as to expose a portion of the optical film layer on the selected primary color filter.

According to some embodiments, a material of forming the optical film layer is selected from a group consisting of materials suitable for forming a gate insulation layer and/or a passivation layer of an array substrate which is to be assembled into a cell together with the color substrate.

BRIEF DESCRIPTION OF THE DRAWINGS

Other objects and advantages of the present disclosure will become apparent from following description of the present disclosure made with reference to the drawings, which may help comprehensive understanding of the present disclosure.

FIGS. 14-16 are schematic diagrams of display panels according to embodiments of the present disclosure, wherein, FIG. 14 shows that two optical film layers are both formed on one of an array substrate and a color substrate, and FIGS. 15-16 show that two optical film layers are formed on an array substrate and a color substrate respectively;

DETAILED DESCRIPTION OF PREFERRED EMBODIMENTS

Figure 1:
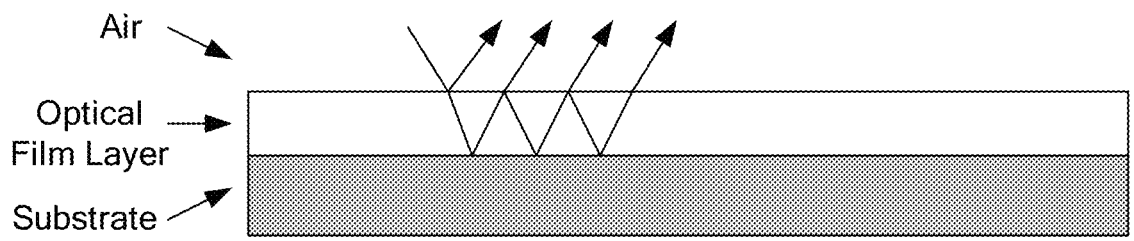
FIG. 1 is a diagram schematically showing the interference principle of a single layer film formed on a substrate.

Technique solutions of the present disclosure will be described in detail hereinafter in combination with exemplary embodiments with reference to the drawings. In the description, same or similar component is indicated by same or similar reference number. Description of the embodiments of the present disclosure with reference to the drawings intends to describe general concepts of the disclosure and should not be understood to limit the present disclosure.

In addition, in the description as below, much specific detail is described to provide comprehensive understanding of the embodiments of the present disclosure for ease of presentation. However, it is obvious one or more embodiments may be implemented without the detail. In other situation, known structure and device are shown by means of diagrammatic presentation to simplify the accomplish drawings.

It is noted that in this text, expressions "on . . . ", "formed on . . . ", "arranged on . . . " may mean one layer is directly formed or arranged on another layer, or may indicate one layer is indirectly formed or arranged on another layer, that is, there is other layer(s) between the two layers.

In techniques knows by the inventors, the color gamut is often increased by improving the LED light source, the backlight module or a color substrate. Specifically, Y (yellow) powders in a package of the LED is replaced with R, G phosphor powders of red and green colors such that red light and green light are separately emitted, thereby increasing the color gamut of the display device; or, the backlight module is modified into a quantum dot backlight module with a solution of a blue LED plus red/green quantum dots, such that the color coverage may reach NTSC 110%; or, the color gamut is increased by adjusting an existing color substrate. These solutions of increasing color gamut, however, all have disadvantages: all these three solutions can not be integrated with existing manufacturing processes of a display substrate, and require separate manufacturing process, thereby their manufacture costs are higher; the color gamut of the display device may only be increased to NTSC 85%~95% by improving the LED light source or color substrate, and although the quantum dot backlight source may increase the color gamut to NTSC 110%, the quantum dot itself has very high cost and is only targeted at high-end market at present. In addition, some upstream manufacturers have developed some material films for increasing the color gamut, these material films may shield against part(s) of the yellow light wave band, but these material films often need to be used in combination with polarizer(s) or to be provided in the backlight module so that the thickness of the backlight module will be greatly increased, and further, manufacturing processes of these material films can not be integrated with the existing manufacturing processes of the display substrate, and separate manufacturing processes and apparatuses are required. Thus, these material films can not be supplied separately by manufacturers of the display panel.

Figure 2:
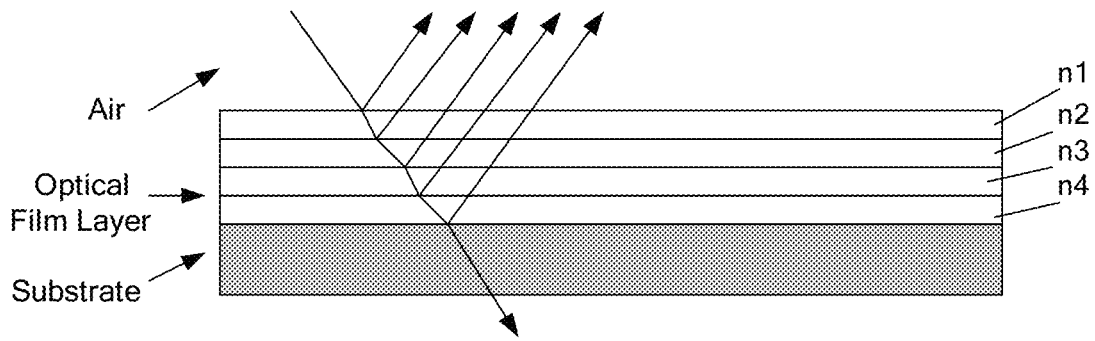
FIG. 2 is a diagram schematically showing the wave-trapping principle of a multilayer film formed on a substrate.
Figure 3:
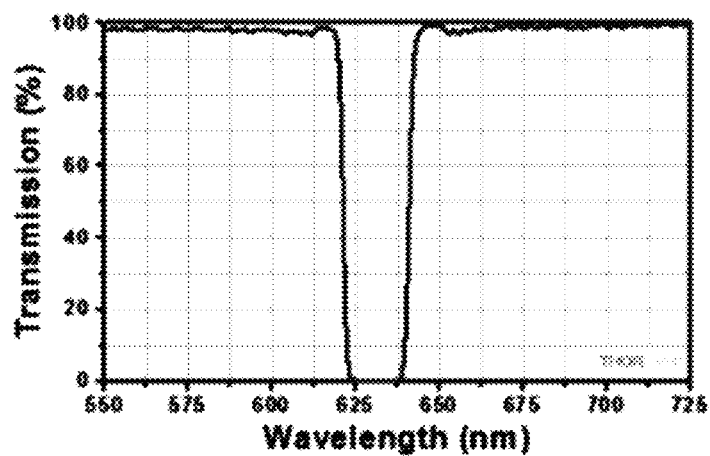
FIG. 3 is a graph schematically showing a light transmittance curve of an exemplary multilayer film formed according to the principle shown in FIG. 2.

Before describing the display substrate according to embodiments of the present disclosure in detail, the interference principle of a single layer film and a multilayer film will be firstly introduced. For a single layer film, as shown in FIG. 1, when light is incident to a surface of the film, both refraction and reflection will occur. When reflected light destructively interferes, the reflective effect of the film will be reduced and in this case the film is an antireflection film; when reflected light constructively interferes, the reflective effect of the film will be improved and in this case the film is a highly reflective film. For a multilayer film, as shown in FIG. 2, when light is incident to the multilayer film (consisted of layers having different refractive indexes n1, n2, n3, n4), both refraction and reflection will occur between layers having different refractive indexes, thereby generating an optical interference effect. By effectively matching respective layers of films in the multilayer film, the optical characteristics of the multilayer film may present such that: in an applicable wave band range, the multilayer film may effectively filter out or cut off light in a particular wavelength range (stop band), while having a good transmittance to light in other wavelength ranges. Such optical characteristics of the multilayer film may be represented by a light transmittance curve. FIG. 3 shows a light transmittance curve of an exemplary multilayer film, wherein, the abscissa axis represents a wavelength (Wavelength) with a unit in "nm", and the longitudinal axis represents a light transmittance (Transmission) or a light cutoff rate with a unit in "%". In the example shown in FIG. 3, for incidence light in a wavelength range of 550 nm to 25 nm, the multilayer film will filter out light in a wavelength range of about 625 nm to 638 nm, while transmitting light in other wavelength ranges therethrough at a transmittance of about 100%.

Hereby, in an embodiment of the present disclosure, an optical film layer may be consisted of a multilayer film, and the multilayer film comprises at least two material layers having different refractive indexes. Optionally, the multilayer film comprises first material layers having a first refractive index and second material layers having a second refractive index, the first material layers and the second material layers being alternately superposed on top of each other.

In embodiments of the present disclosure, the above optical film layer is formed (for example, deposited) on a display substrate, so that a display substrate integrated with the optical film layer is formed, thereby improving the color gamut of the display device. In the following, a display substrate integrated with the optical film layer according to embodiments of the present disclosure will be described in detail with reference to the drawings.

It is noted that the following description will be made by taking a display substrate having RGB (red, green, blue) three primary colors. For the display substrate adopting the RGB (red, green, blue) three primary colors, the purer the three primary colors are, the narrower the full width at half maximum is, thereby the wider the rendering colors are, that is, the wider the color gamut is. A spectral distribution of the visible light is provided in following table 1:

TABLE 1 spectral distribution of the visible light

| spectrum color of visible light | wavelength range (nm) |
|---|---|
| red(R) | about 625~740 nm |
| orange | about 590~625 nm |
| yellow | about 565~590 nm |
| green(G) | about 500~565 nm |
| cyan | about 485~500 nm |
| blue(B) | about 440~485 nm |
| purple | about 380~440 nm |

In current display substrate, blue light is generally used as excitation light and has a narrower full width at half maximum, thus it is not necessarily modulated. Color purities of red light and green light may be improved by filtering out bluish green light (cyan light), yellow light and orange light, so as to increase the color gamut of the display substrate.

According to an embodiment of the present disclosure, the optical film layer may be designed to have following optical characteristics: in the wavelength range of the visible light, the optical film layer may effectively filter out or cut off yellow light, while having a good transmittance to light in other wavelength ranges, and in this case, the optical film layer is formed as a yellow light cut-off layer.

Figure 4:
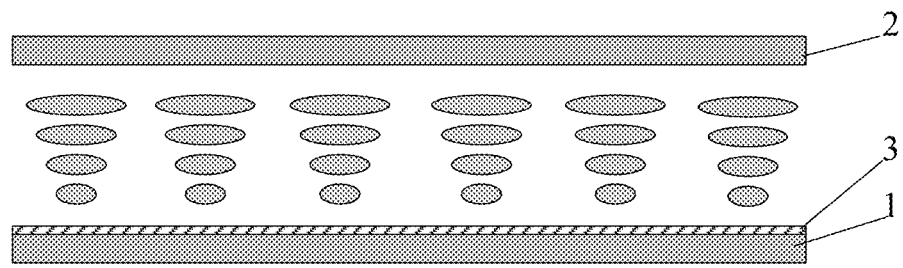
FIG. 4 is a schematic diagram of a display panel integrated with an optical film layer according to an embodiment of the present disclosure.
Figure 4:
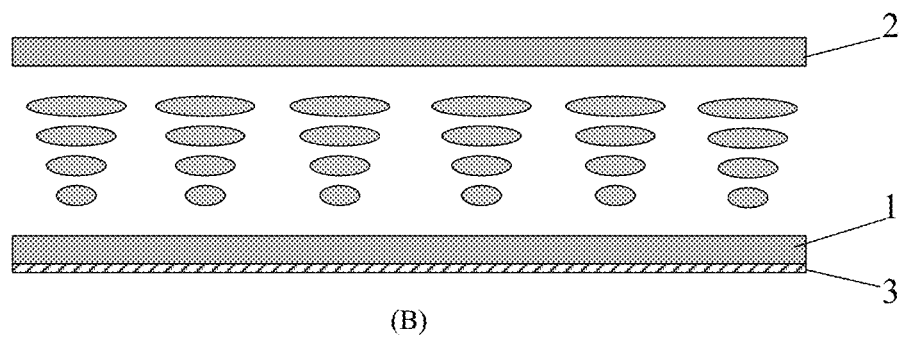
Figure 4:
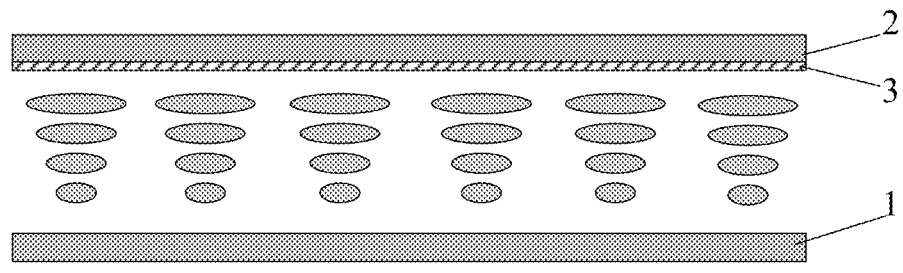
Figure 4:
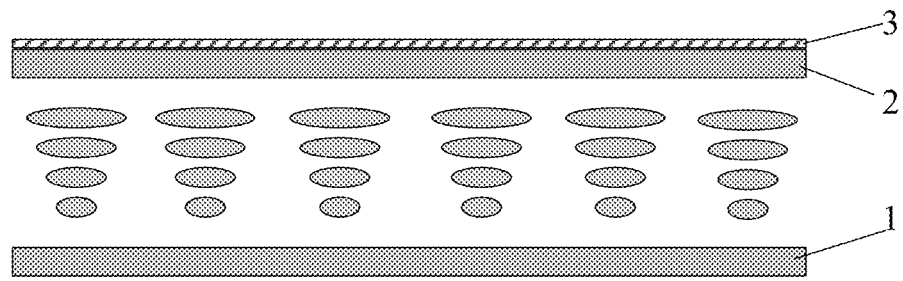

FIG. 4 shows schematic diagrams of the optical film layer according to embodiments of present disclosure formed (for example, deposited) on an array substrate or a color substrate of a display substrate. As shown, a display device comprises an array substrate 1, a color substrate 2, a liquid crystal layer disposed between the array substrate 1 and the color substrate 2, and an optical film layer 3 formed on the array substrate 1 or on the color substrate 2. As shown in FIG. 4(A), the optical film layer 3 is formed on a side of the array substrate 1 facing the color substrate 2. As shown in FIG. 4(B), the optical film layer 3 is formed on a side of the array substrate 1 facing away from the color substrate 2. As shown in FIG. 4(C), the optical film layer 3 is formed on a side of the color substrate 2 facing the array substrate 1. As shown in FIG. 4(D), the optical film layer 3 is formed on a side of the color substrate 2 facing away from the array substrate 1. When the array substrate 1 and the color substrate 2 are assembled into a module (cell), in FIGS. 4(A) and 4(C), the optical film layer 3 is formed inside the cell, that is, an In-Cell structure is formed; in FIGS. 4(B) and 4(D), the optical film layer 3 is formed outside the cell, that is an Out-Cell is formed. In other words, in an embodiment of the present disclosure, the optical film layer may be integrated on the array substrate or on the color substrate, and may also form an In-Cell or Out-Cell structure.

It is noted that in this text, the expression "optical film layer formed on a base substrate" or "optical film layer formed on an array substrate or a color substrate" means that processes of forming a layered film structure of the optical film layer are implemented on the base substrate, the array substrate or color substrate, and does not mean that the layered film structure is firstly formed and then is fixed onto the base substrate, the array substrate or color substrate by attachment, adhesive or the like.

Further, in an embodiment of the present disclosure, the optical film layer 3 may be formed of a material selected from a group consisting of materials suitable for forming a gate insulation layer and/or a passivation layer of the array substrate 1. For example, the gate insulation layer and/or passivation layer of the array substrate is often formed of silicon nitride or silicon oxide, then the optical film layer may be also formed of silicon nitride and silicon oxide. The present disclosure, however, is not limited to these two materials; for example, the gate insulation layer and/or passivation layer of the array substrate may be also formed of silicon oxynitride, amorphous silicon, polysilicon, gallium nitride, tungsten, graphene, titanium dioxide, silicon carbide, monocrystalline silicon or magnesium fluoride, and accordingly, the optical film layer according to embodiments of the present disclosure may also be formed from these materials. Since the optical film layer according to embodiments of the present disclosure may be formed from the same material(s) as the gate insulation layer and/or the passivation layer, the color gamut may be improved in a lower cost in embodiments of the present disclosure.

In an embodiment of the present disclosure, since the optical film layer may be formed from silicon nitride and silicon oxide, wherein, the refractive index of the silicon nitride material increases as its nitrogen content reduces, and thus the silicon nitride material may be used as a high refractive index material; the silicon oxide material has a relatively fixed refractive index and thus may be used as a low refractive index material. In the present disclosure, the optical film layer may be formed from the material of the passivation layer, and there may be a larger difference in refractive index of the passivation layer, which may have a refractive index range of 1.2 to 4.0. thus, the optical film layer according to embodiments of the present disclosure may comprise a multilayer film, and the number of layers of the multilayer film may be controlled in a range of 5 to 50, for example, a 30 layer-film design may be adopted in consideration of actual processes, that is, an optical film layer having a smaller number of layers may meet design requirements, and a thickness of such designed optical film layer is generally tens or hundreds of nanometers only, thereby the film layer configuration of the display substrate may be greatly simplified, and a light and thin tendency of a display module is satisfied.

Furthermore, in manufacturing processes of the display substrate, especially in manufacturing processes of TFT, plasma enhanced chemical vapor deposition (PECVD) process is often used to manufacture some insulative dielectric layers, for example, a gate insulation layer and a passivation layer made of materials such as silicon dioxide, silicon nitride, and silicon oxynitride. In an embodiment of the present disclosure, the same process may also be utilized to form the optical film layer, that is, the PECVD process is used to form the optical film layer 3 on the base substrate. In the plasma enhanced chemical vapor deposition (PECVD), reaction gas is ionized such that molecules of the gas are resolved, combined, excitated and ionized so as to prompt generation of reactive active groups, forming plasma, thus a film may be manufactured at a low temperature. Further, the PECVD technique is advantageous in depositing a film having good properties at a low temperature (450~600K) by means of electric activation of plasma, its operation way is simple and flexible, process repeatability and uniformity are better, so that it can not only deposit various films on substrates having different complex shapes, but also deposit a film having a gradient refractive index by varying proportions of flows of gases. In addition, similar to a sputtering process, the PECVD may manufacture films having different stress states by varying parameters of the deposition process. Thus, by using the PECVD process, optical characteristics of the optical film layer formed on the base substrate may be adjusted such that light in a selected wavelength range may be effectively filtered out, thereby effectively improving the color gamut.

As can be seen, in embodiments of the present disclosure, the optical film layer and the gate insulation layer and/or passivation layer may be formed from same material(s) by same processes, and thus, in terms of manufacturing process, the manufacturing process of the optical film layer can be integrated into existing manufacturing processes of TFT or array and will not adversely affect existing manufacturing processes; in terms of structure, the optical film layer can be integrated completely onto the array substrate and/or color substrate, without additionally increasing the thickness of the cell or backlight module.

In the following, integration of the optical film layer 3 with the array substrate 1 and/or the color substrate 2 will be described in detail with reference to FIGS. 5 to 10.

Figure 5:
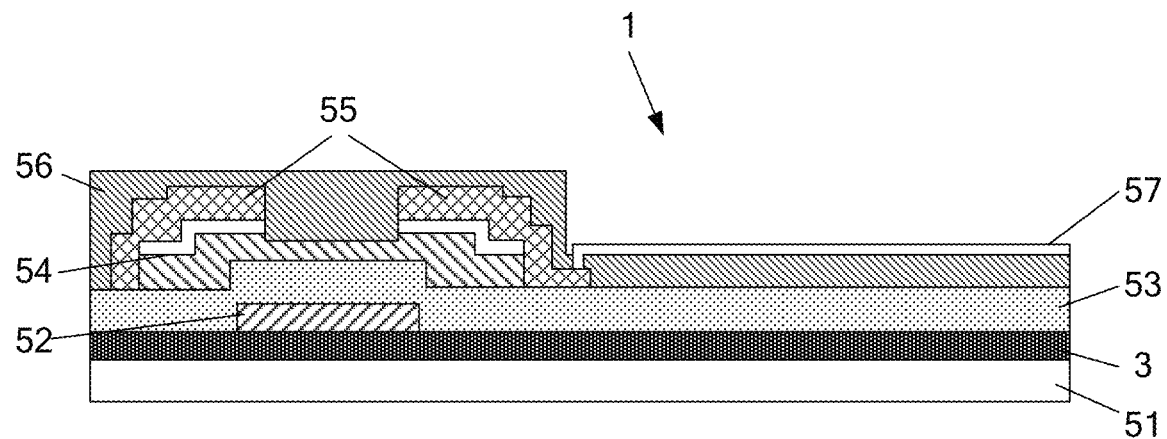
FIG. 5 is a schematic diagram of an array substrate integrated with an optical film layer according to an embodiment of the present disclosure, wherein the optical film layer is separately formed on a base substrate of the array substrate.

FIG. 5 shows a schematic diagram of an array substrate according to an embodiment of the present disclosure. As shown in FIG. 5, the array substrate 1 comprises a base substrate 51, the optical film layer 3, a gate electrode layer 52, a gate insulation layer 53, an active layer 54, a source/drain layer 55, a passivation layer 56 and a pixel electrode layer 57 arranged successively. That is, the optical film layer 3 is separately formed on the base substrate 51 of the array substrate 1, for filtering out or cutting off light having a wavelength in a selected wavelength range so as to avoid or prevent the light from being transmitted through the optical film layer 3, and for allowing light in other wavelength ranges to be transmitted through the optical film layer 3. In some examples, an ohmic contact layer, such as α-Si layer, may be formed between the active layer 54 and the source/drain layer 55, as described below.

It is noted that although certain transmittable structures or film layers on an existing base substrate may also filter out some light in an objective, these structures or film layers should be substantially transmittable. Thus, in order to improve light transmittance, these structures or film layers should be configured to reduce loss of light of any wavelengths as much as possible. In this text, the expression "filter out light having a wavelength in a selected wavelength range" or "filter out or cut off light having a wavelength in a selected wavelength range so as to avoid or prevent the light from being transmitted through the optical film layer" means that the optical film layer is designed to filter out or cut off light in a selected wavelength range so as to improve color purities of primary colors, thereby increasing the color gamut of the display substrate.

Figure 6:
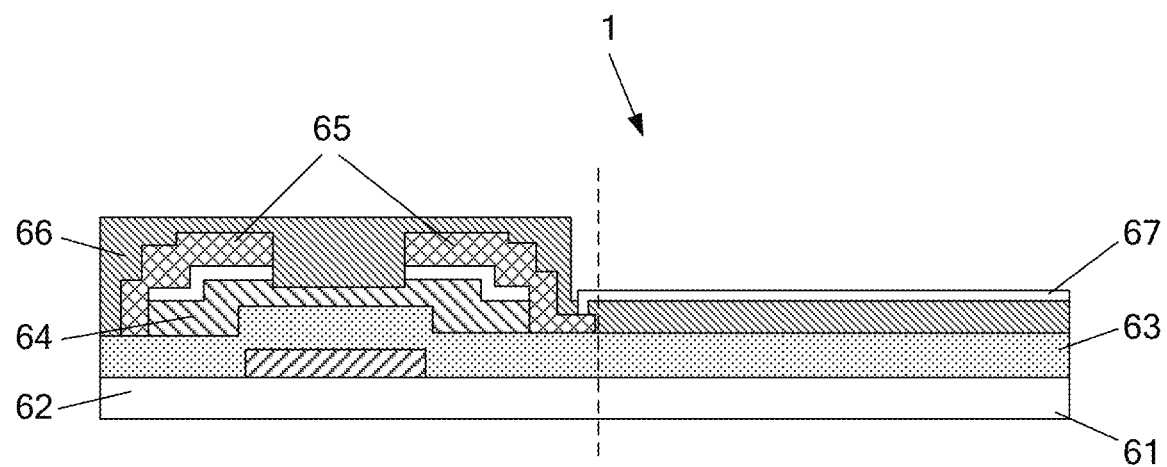
FIG. 6 is a schematic diagram of an array substrate integrated with an optical film layer according to an embodiment of the present disclosure, wherein the optical film layer is formed of a gate insulation layer and/or a passivation layer formed on the array substrate.

FIG. 6 shows a schematic diagram of an array substrate according to another embodiment of the present disclosure. As shown in FIG. 6, the array substrate 1 comprises a base substrate 61, a gate electrode layer 62, a gate insulation layer 63, an active layer 64, a source/drain layer 65, a passivation layer 66 and a pixel electrode layer 67 arranged successively. In some examples, an ohmic contact layer, such as α-Si layer, may be formed between the active layer 64 and the source/drain layer 65, as described below. In this embodiment, both the gate insulation layer 63 and/or the passivation layer 66 may constitute the above optical film layer 3 for filtering out or cutting off light in a selected wavelength range so as to avoid or prevent the light in the selected wavelength range from being transmitted therethrough. As an example, the gate insulation layer 63 and/or the passivation layer 66 may be a multilayer film, and layers of films of the multilayer film may be effectively matched, for example, parameters such as thickness, material, material refractive index and the like of the layers of films may be effectively matched, such that the gate insulation layer 63 and/or the passivation layer 66 may be rendered with following optical characteristics: in an applicable wave band range, the multilayer film may effectively filter out or cut off light in a particular wavelength range (stop band), while having a good transmittance to light in other wavelength ranges. That is, the gate insulation layer and/or the passivation layer may be integral with the above optical film layer such that the same layer has two functions, or the gate insulation layer and/or the passivation layer is doubled as or also used as the optical film layer having the above optical characteristics. For example, when the gate insulation layer 63 is formed or also used as the optical film layer, the gate insulation layer 63 can not only function to insulate the gate electrode layer, but also function to filter out or cut off light in a selected wavelength range.

Figure 7:
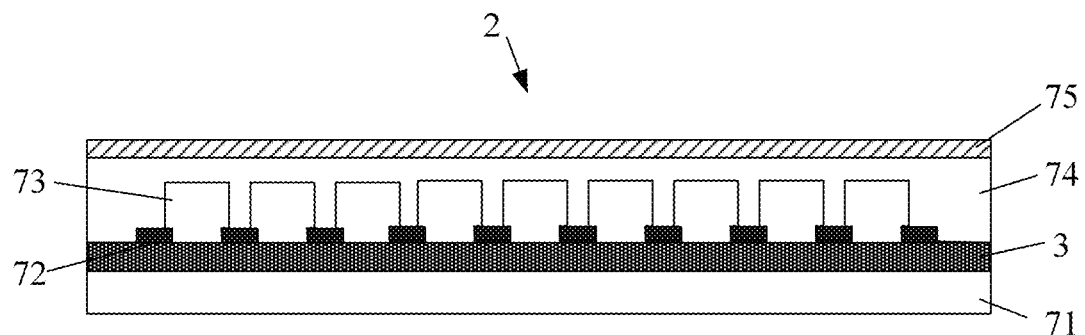
FIG. 7 is a schematic diagram of a color substrate integrated with an optical film layer according to an embodiment of the present disclosure, wherein the optical film layer is formed between a base substrate and a black matrix layer of the color substrate.

FIG. 7 shows a schematic diagram of a color substrate according to an embodiment of the present disclosure. As shown in FIG. 7, the color substrate 2 comprises a base substrate 71, the optical film layer 3, a black matrix layer 72, a color filter layer 73, a protective layer 74 and a transparent electrode layer 75 arranged successively. That is, the above optical film layer 3 is directly formed on the base substrate 71 of the color substrate 2, for filtering out or cutting off light in a selected wavelength range so as to avoid or prevent the light from being transmitted through the optical film layer 3. Although not shown, those skilled in the art will understand that the above optical film layer may be also formed between the black matrix layer 72 and the transparent electrode layer 75, so as to filter out or cut off light in a selected wavelength range so as to avoid or prevent the light from being transmitted through the optical film layer 3.

Figure 8:
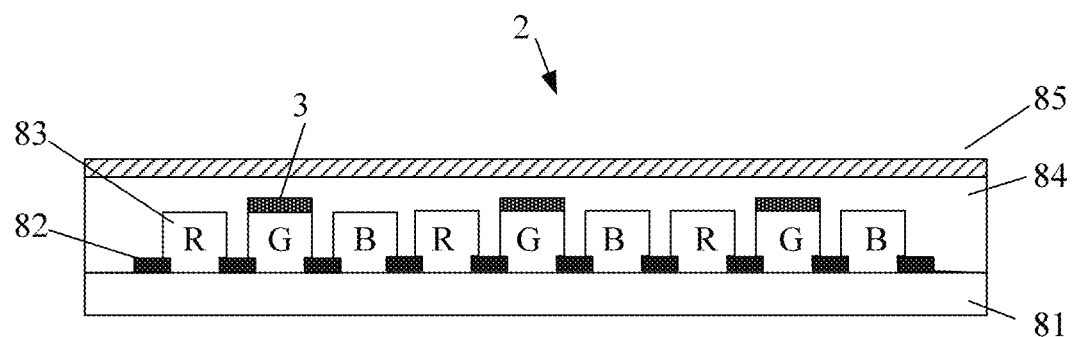
FIG. 8 is a schematic diagram of a color substrate integrated with an optical film layer according to an embodiment of the present disclosure, wherein the optical film layer is only formed at a position of the color substrate corresponding to a selected primary color sub-pixel.

FIG. 8 shows a schematic diagram of a color substrate according to another embodiment of the present disclosure. As shown in FIG. 8, the color substrate 2 comprises a base substrate 81, a black matrix layer 82, a color filter layer 83, a protective layer 84 and a transparent electrode layer 85 arranged successively. The color filter layer 83 is arranged corresponding to a plurality of sub-pixels arranged in an array, which, in a RGB display substrate, include an R sub-pixel, a G sub-pixel and a B sub-pixel. As can be seen from the above discussion, when blue light is used as excitation light, it has a narrower full width at half maximum and thus is not necessarily modulated, and color purities of red light and green light may be improved by filtering out bluish green light (cyan light), yellow light and orange light so as to increase the color gamut of the display substrate. In an example, the above optical film layer 3 may be only formed on the G (green) sub-pixel so as to effectively filter out or cut off yellow light and thereby avoid or prevent yellow light from being transmitted from the optical film layer 3.

The integrated structures of the optical film layer and the display substrate (array substrate/color substrate) according to embodiments of the present disclosure have been described above in combination the drawings. In the following, integration of a manufacturing process of the optical film layer with manufacturing processes of the display substrate will be further described with reference to the drawings, according to embodiments of the present disclosure.

Figure 9:
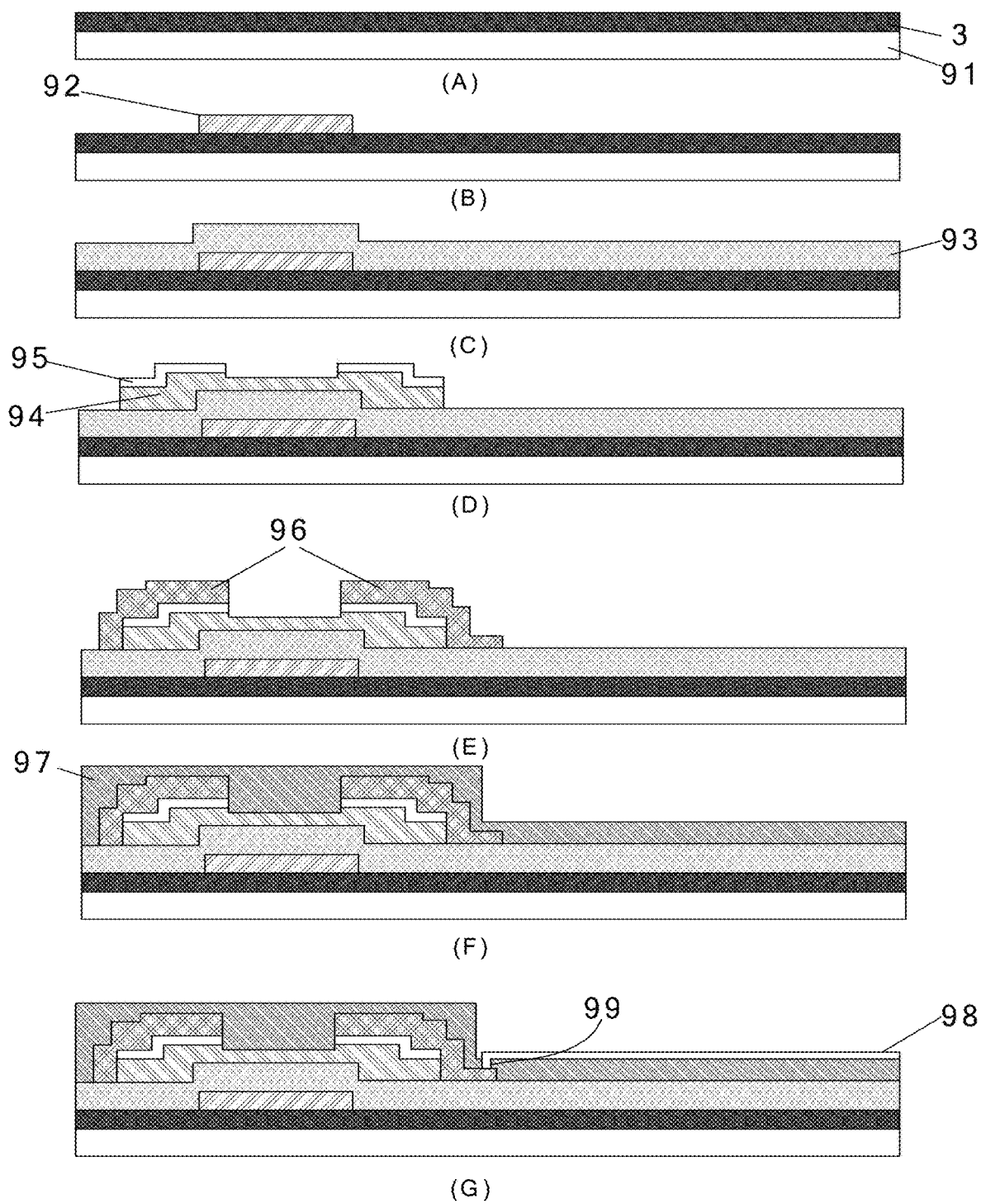
FIGS. 9(A)-(G) are schematic diagrams showing processes of a method of manufacturing an array substrate according to an embodiment of the present disclosure.

According to an embodiment of the present disclosure, as shown in FIG. 9, a method of manufacturing an array substrate comprises steps of:

providing a base substrate 91;

forming the optical film layer 3 on the base substrate 91, as shown in FIG. 9(A);

forming a gate metal layer 92 on the optical film layer 3, and processing the gate metal layer by a patterning process to form a pattern of a gate electrode, as shown in FIG. 9(B);

forming a gate insulation layer 93 on the base substrate 91, as shown in FIG. 9(C);

forming an α-Si layer 94 and an n$^+$ α-Si layer 95 sequentially on the gate insulation layer 93, and processing the α-Si layer and the n$^+$ α-Si layer by a patterning process to form an active layer, as shown in FIG. 9(D);

forming a source/drain layer 96 on the active layer, and processing the source/drain layer by a patterning process to form patterns of source and drain electrodes, as shown in FIG. 9(E);

forming a passivation layer 97 on the source/drain layer, as shown in FIG. 9(F); and forming a through hole 99 in the passivation layer to expose a portion of the drain electrode, and forming a transparent electrode layer (ITO layer) 98 on the passivation layer, such that the transparent electrode layer 98 is electrically connected with the drain electrode via the through hole 99, as shown in FIG. 9(G).

In the above method, except the step of forming the optical film layer 3, other steps are all process steps of manufacturing the array substrate, that is, the process step of forming the optical film layer 3 will not adversely affect the processes of manufacturing the array substrate.

In an embodiment, the above optical film layer 3, the gate metal layer 92, the gate insulation layer 93, the α-Si layer 94, the n$^+$ α-Si layer 95, the source/drain layer 96, the passivation layer 97 and the transparent electrode layer 98 may all be formed by using a deposition process, for example, formed by a plasma enhanced chemical vapor deposition (PECVD) process. As can be seen, the process of forming the optical film layer 3 may be same as that of forming other layer of the array substrate. Further, the material of forming the optical film layer 3 may be same as material(s) of forming the gate insulation layer 93 and/or the passivation layer 97. Thus, the manufacturing process of the optical film layer according to embodiments of the present disclosure may be completely integrated into the manufacturing processes of the display substrate, and a manufacturer of the display substrate may manufacture the optical film layer while manufacturing the display substrate, thus the manufacturer of the display substrate may independently manufacture a display device having a high color gamut, and the high color gamut solution does not require adding additional production apparatuses and production materials and thereby will not additionally increase manufacturing cost.

Figure 10:
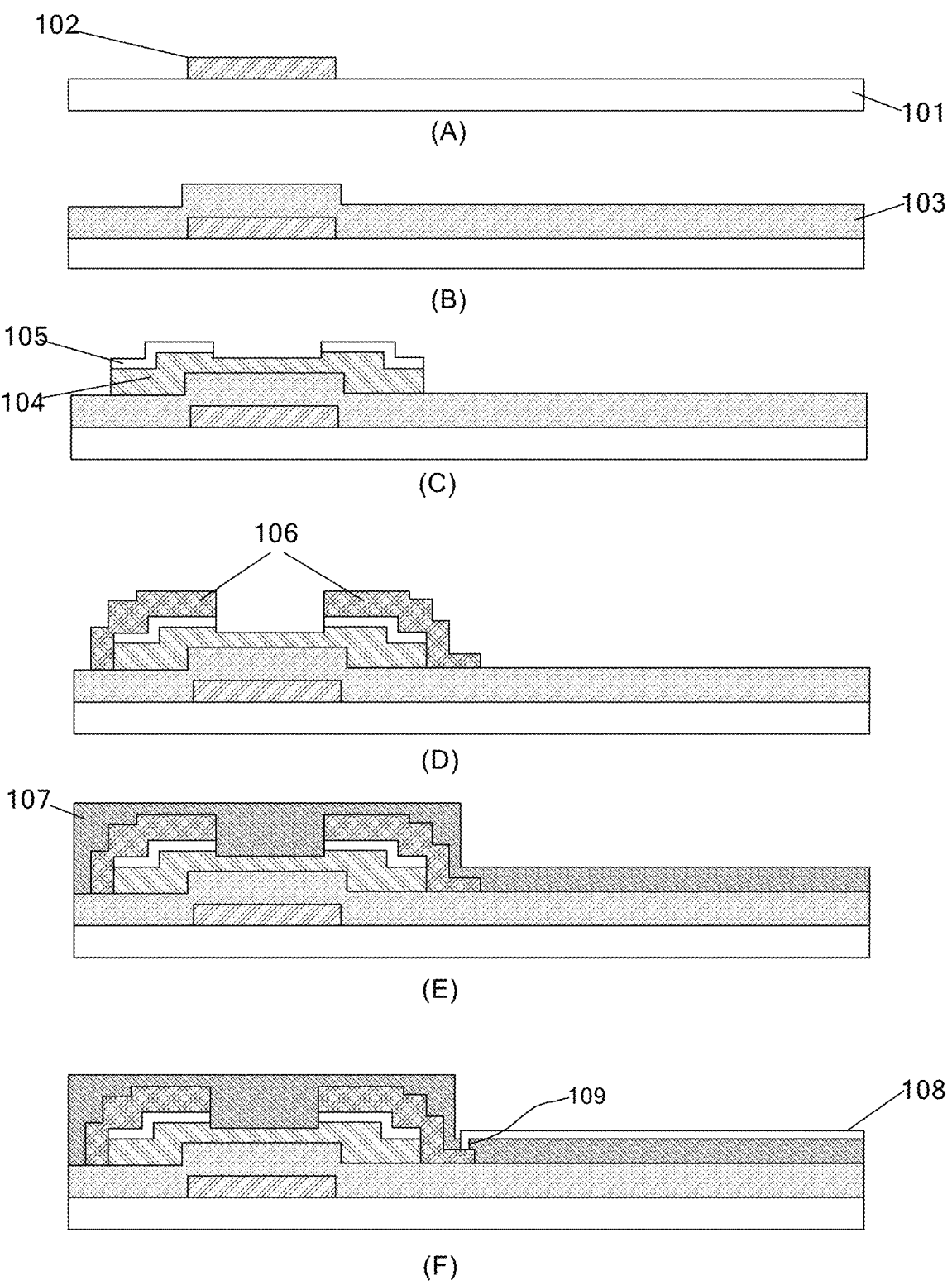
FIGS. 10(A)-(F) are schematic diagrams showing processes of a method of manufacturing an array substrate according to another embodiment of the present disclosure.

According to another embodiment of the present disclosure, as shown in FIG. 10, a method of manufacturing an array substrate comprises steps of:

providing a base substrate 101;

forming a gate metal layer 102 on the base substrate 101, and processing the gate metal layer by a patterning process to form a pattern of a gate electrode, as shown in FIG. 10(A);

forming a gate insulation layer 103 on the base substrate 101, as shown in FIG. 10(B);

forming an α-Si layer 104 and an n$^+$ α-Si layer 105 sequentially on the gate insulation layer 103, and processing the α-Si layer and the n$^+$ α-Si layer by a patterning process to form an active layer, as shown in FIG. 10(C);

forming a source/drain layer 106 on the active layer, and processing the source/drain layer by a patterning process to form patterns of source and drain electrodes, as shown in FIG. 10(D);

forming a passivation layer 107 on the source/drain layer, as shown in FIG. 10(E); and forming a through hole 109 in the passivation layer to expose a portion of the drain electrode, and forming a transparent electrode layer (ITO layer) 108 on the passivation layer, such that the transparent electrode layer 108 is electrically connected with the drain electrode via the through hole 109, as shown in FIG. 10(F).

In an example, the step(s) of forming the gate insulation layer 103 and/or the passivation layer 107 comprise(s): configuring the gate insulation layer 103 and/or the passivation layer 107 as an optical film layer configured to filter out light in a selected wavelength range so as to avoid or prevent the light in the selected wavelength range from being transmitted from the optical film layer. In an example, the step(s) of forming the gate insulation layer 103 and/or the passivation layer 107 comprise(s): alternately arranging a first material having a first refractive index and a second material having a second refractive index higher than the first refractive index to form a multilayer film, so as to form the gate insulation layer 103 and/or the passivation layer 107. In an embodiment, the first material and/or second material comprise(s) material(s) suitable for forming the gate insulation layer and/or the passivation layer, for example, material(s) selected from a group comprising but not limited to silicon nitride, silicon oxide, silicon oxynitride, amorphous silicon, polysilicon, gallium nitride, tungsten, graphene, titanium dioxide, silicon carbide, monocrystalline silicon and magnesium fluoride.

Figure 11:
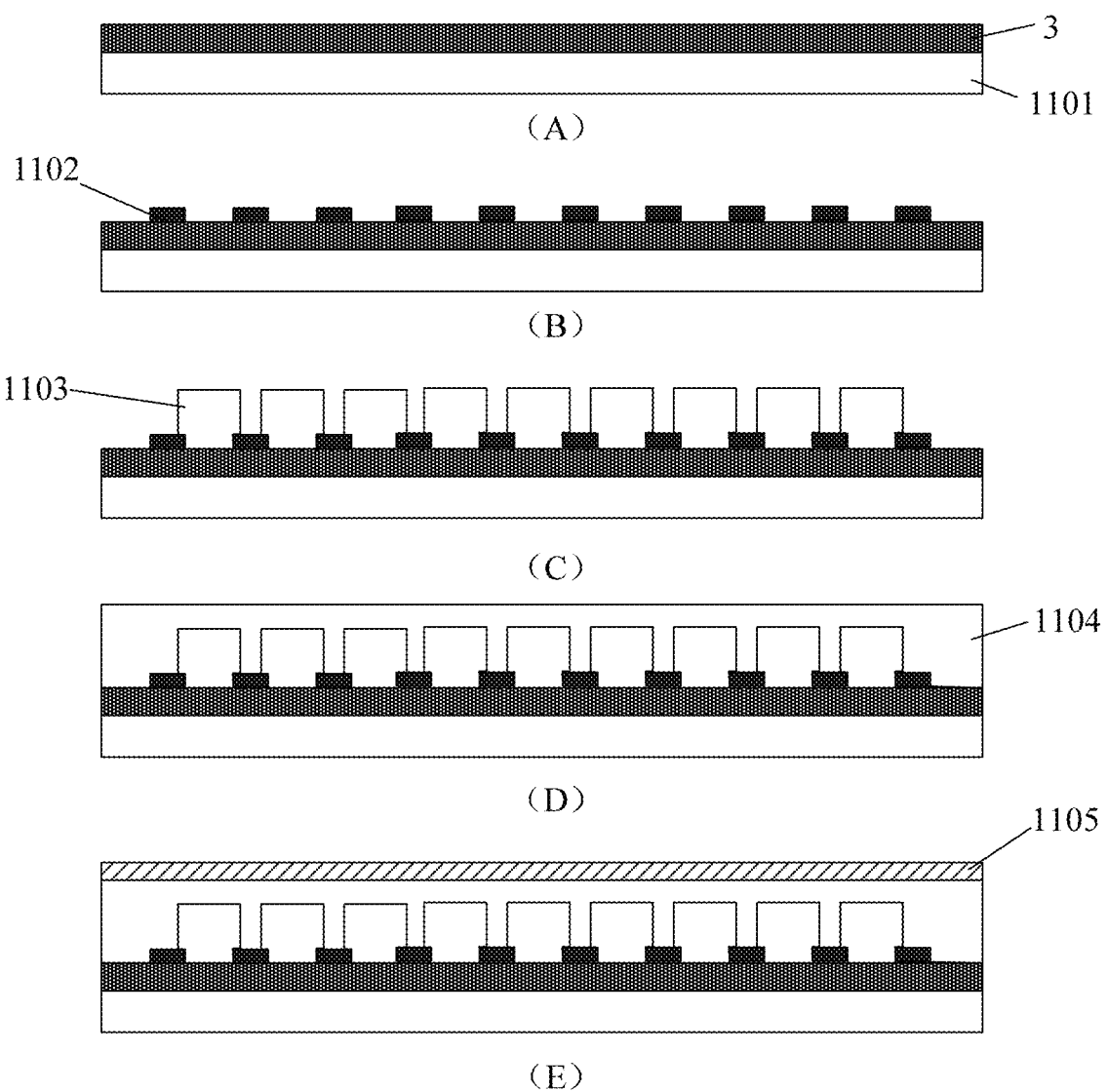
FIGS. 11(A)-(E) are schematic diagrams showing processes of a method of manufacturing a color substrate according to an embodiment of the present disclosure.

According to an embodiment of the present disclosure, as shown in FIG. 11, a method of manufacturing a color substrate comprises steps of:

providing a base substrate 1101;

forming the optical film layer 3 on the base substrate 1101, as shown in FIG. 11(A);

forming a black resin layer 1102 on the optical film layer 3, and patterning the black resin layer to form a plurality of black matrixes, as shown in FIG. 11(B);

forming a color filter layer 1103 on the patterned black resin layer 1102, and patterning the color filter layer so as to form a plurality of color filters corresponding to a plurality of primary color sub-pixels, as shown in FIG. 11(C);

forming a protective layer 1104 on the patterned color filter layer 1103, as shown in FIG. 11(D); and forming a transparent electrode layer 1105 on the protective layer 1104, as shown in FIG. 11(E).

Figure 12:
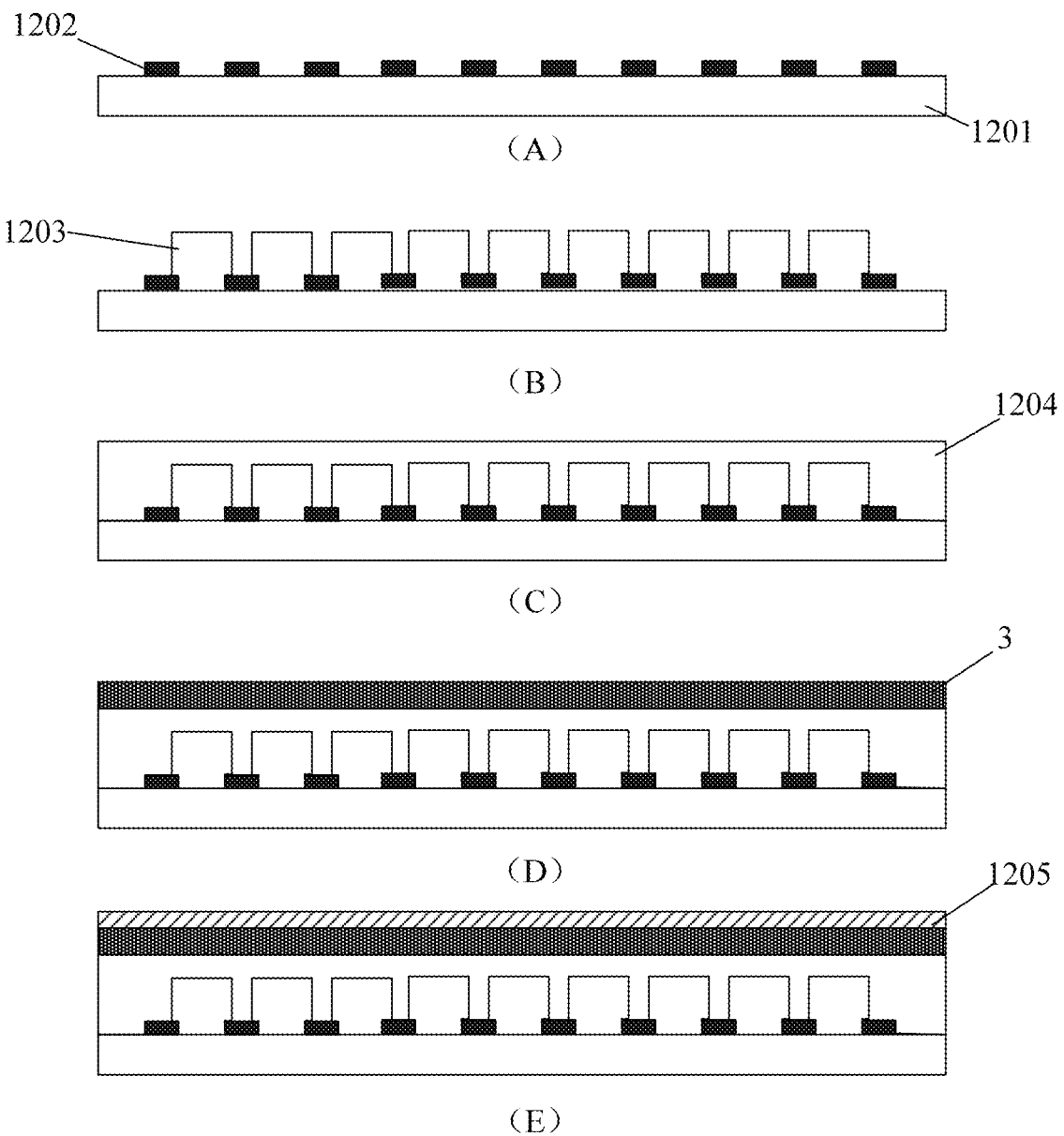
FIGS. 12(A)-(E) are schematic diagrams showing processes of a method of manufacturing a color substrate according to another embodiment of the present disclosure.

According to another embodiment of the present disclosure, as shown in FIG. 12, a method of manufacturing a color substrate comprises steps of:

providing a base substrate 1201;

forming a black resin layer 1202 on the base substrate 1201, and patterning the black resin layer to form a plurality of black matrixes, as shown in FIG. 12(A);

forming a color filter layer 1203 on the black resin layer 1202, and patterning the color filter layer so as to form a plurality of color filters corresponding to a plurality of primary color sub-pixels, as shown in FIG. 12(B);

forming a protective layer 1204 on the patterned color filter layer 1203, as shown in FIG. 12(C);

forming the optical film layer 3 on the protective layer 1204, as shown in FIG. 12(D); and forming a transparent electrode layer 1205 on the optical film layer 3, as shown in FIG. 12(E).

In the above method, the optical film layer may be formed on the whole base substrate regardless of pixels, facilitating manufacturing the optical film layer. In an alternative embodiment, the optical film layer may be only formed at position(s) corresponding to certain or some sub-pixel(s), so as to filter out or cut off light in a particular wavelength range from a selected primary color sub-pixel, while not affecting other primary color sub-pixels. For example, as can be seen from the above discussion, when blue light is used as excitation light, it has a narrower full width at half maximum and thus is not necessarily modulated, and color purities of red light and green light may be improved by filtering out bluish green light (cyan light), yellow light and orange light so as to increase the color gamut of the display substrate. In an example, the above optical film layer 3 may only formed on a position corresponding to the G (green) sub-pixel, for example only on the G color filter, so as to effectively filter out or cut off yellow light and avoid or prevent yellow light from being transmitted from the optical film layer.

Figure 13:
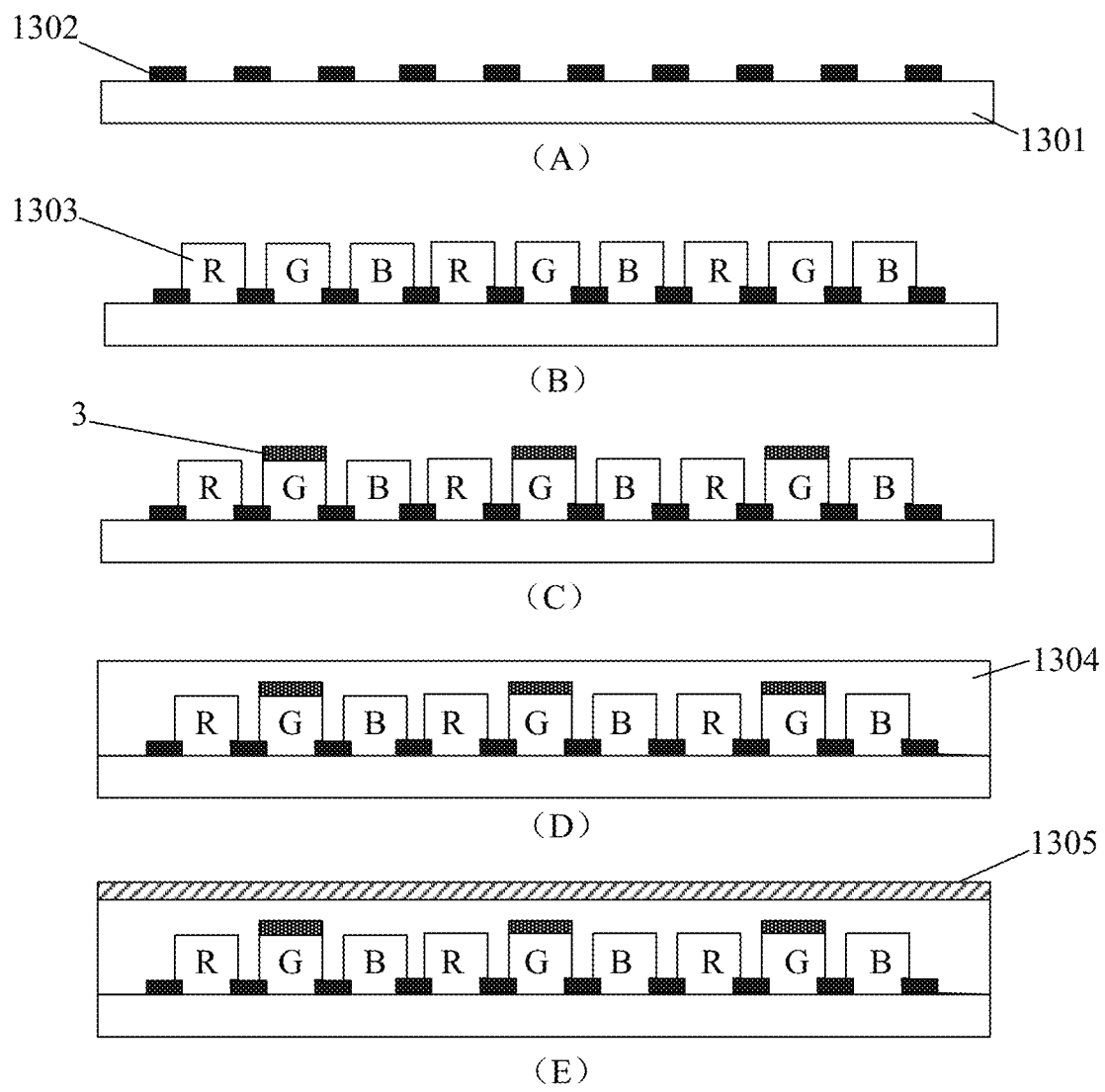
FIGS. 13(A)-(E) are schematic diagrams showing processes of a method of manufacturing a color substrate according to a further embodiment of the present disclosure, wherein an optical film layer is only formed at a position of the color substrate corresponding to a selected primary color sub-pixel.

As such, according to another embodiment of the present disclosure, as shown in FIG. 13, a method of manufacturing a color substrate may comprises steps of:

providing a base substrate 1301;

forming a black resin layer 1302 on the base substrate 1301, and patterning the black resin layer to form a plurality of black matrixes, as shown in FIG. 13(A);

forming a color filter layer 1303 on the patterned black resin layer 1302, and patterning the color filter layer 1303 so as to form a plurality of color filters R, G, B corresponding to a plurality of primary color sub-pixels, as shown in FIG. 13(B);

forming the optical film layer 3 only on the G color filter, as shown in FIG. 13(C);

forming a protective layer 1304 on the optical film layer 3, as shown in FIG. 13(D); and forming a transparent electrode layer 1305 on the protective layer 1304, as shown in FIG. 13(E).

More specifically, the step of forming the optical film layer 3 on the G color filter comprises: forming the optical film layer 3 only at a position corresponding to a selected primary color filter (G sub-pixel) (that is, only on the G color filter) by using a mask. Alternatively, the step of forming the optical film layer 3 on the G color filter comprises: forming the optical film layer at positions corresponding to all sub-pixels (for example, on all primary color filters), and etching off, by using an etching process, portions of the optical film layer at positions corresponding to other primary color filters except the selected primary color filter (for example, etching off portions of the optical film layer on other primary color filters except the selected primary color filter) so as to form the optical film layer 3 at a position corresponding to the selected primary color sub-pixel (for example, on the selected primary color filter).

Similarly, in the above method, a material of forming the optical film layer is selected from a group consisting of materials suitable for forming a gate insulation layer and/or a passivation layer of an array substrate which is to be assembled into a cell together with the color substrate, for example, selected from a group comprising but not limited to silicon nitride, silicon oxide, silicon oxynitride, amorphous silicon, polysilicon, gallium nitride, tungsten, graphene, titanium dioxide, silicon carbide, monocrystalline silicon and magnesium fluoride.

Further, according to an embodiment of the present disclosure, there is provided a display panel, comprising an array substrate and a color substrate arranged opposite to each other. The array substrate and the color substrate may be those of any of the embodiments or those manufactured according to the method of any of the above embodiments.

Figure 14:
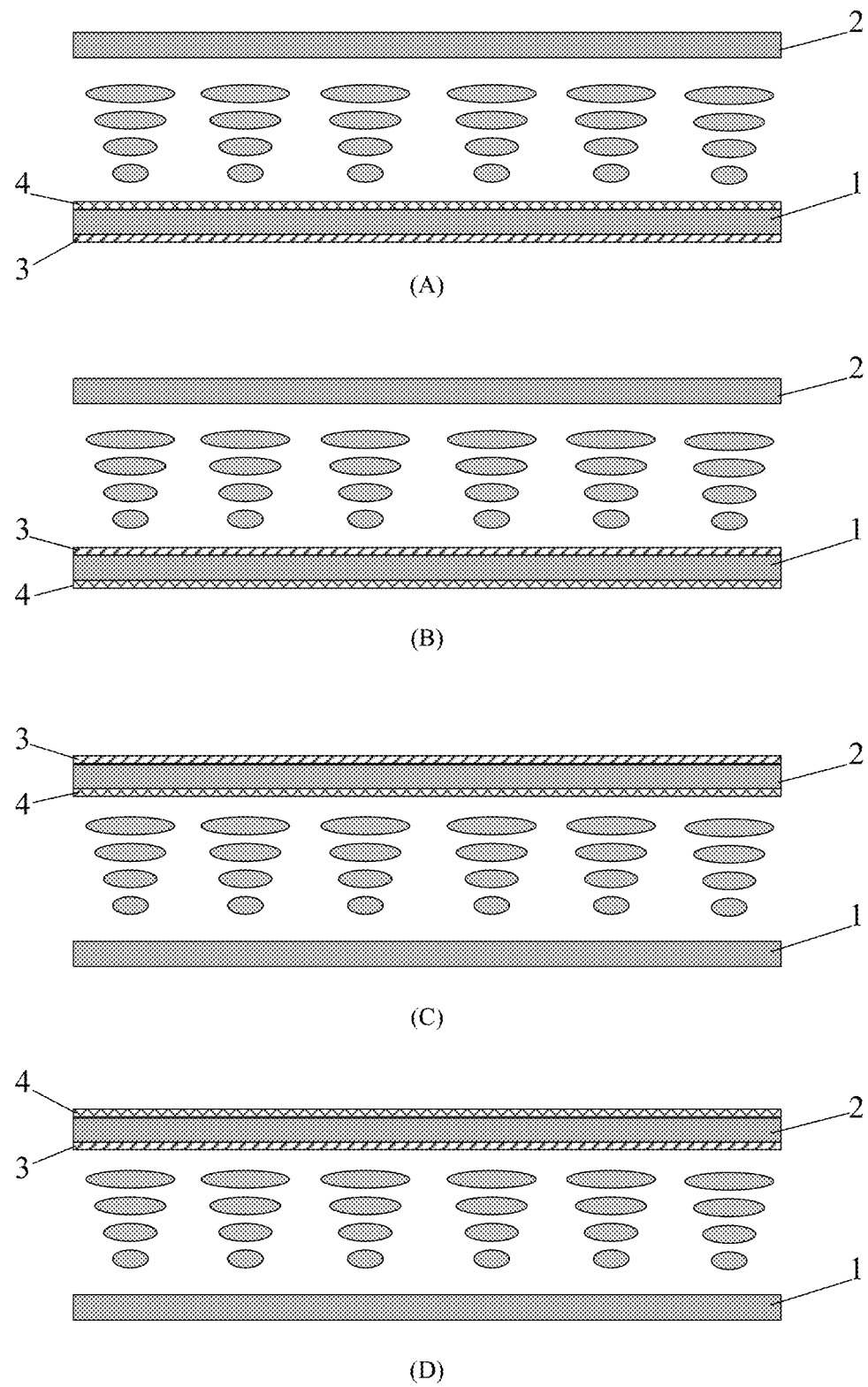
Figure 15:
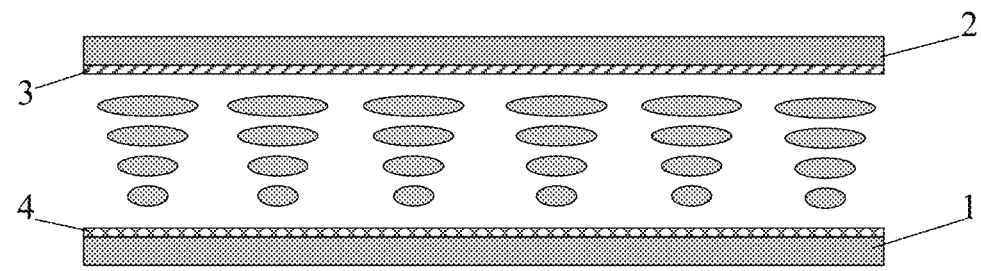
Figure 15:
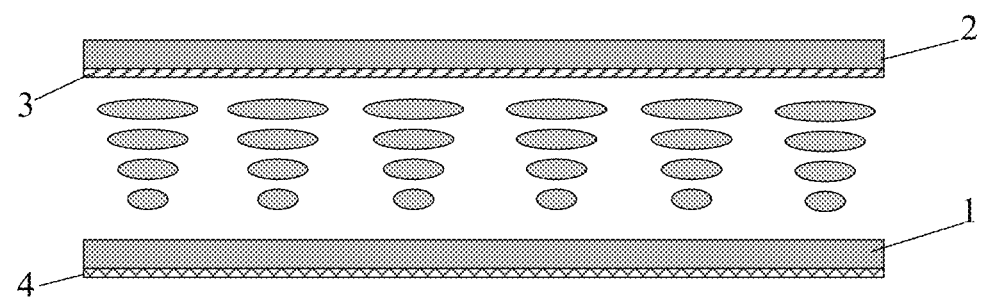
Figure 15:
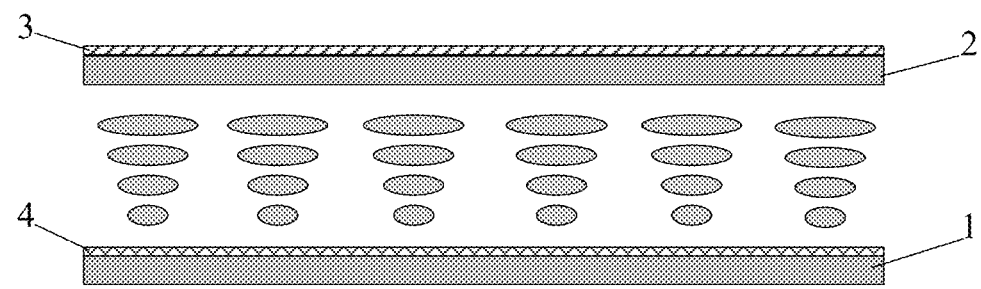
Figure 15:
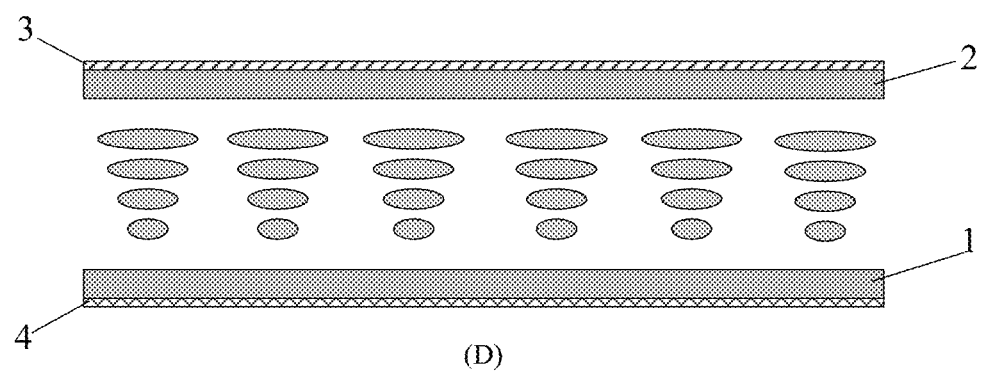
Figure 16:
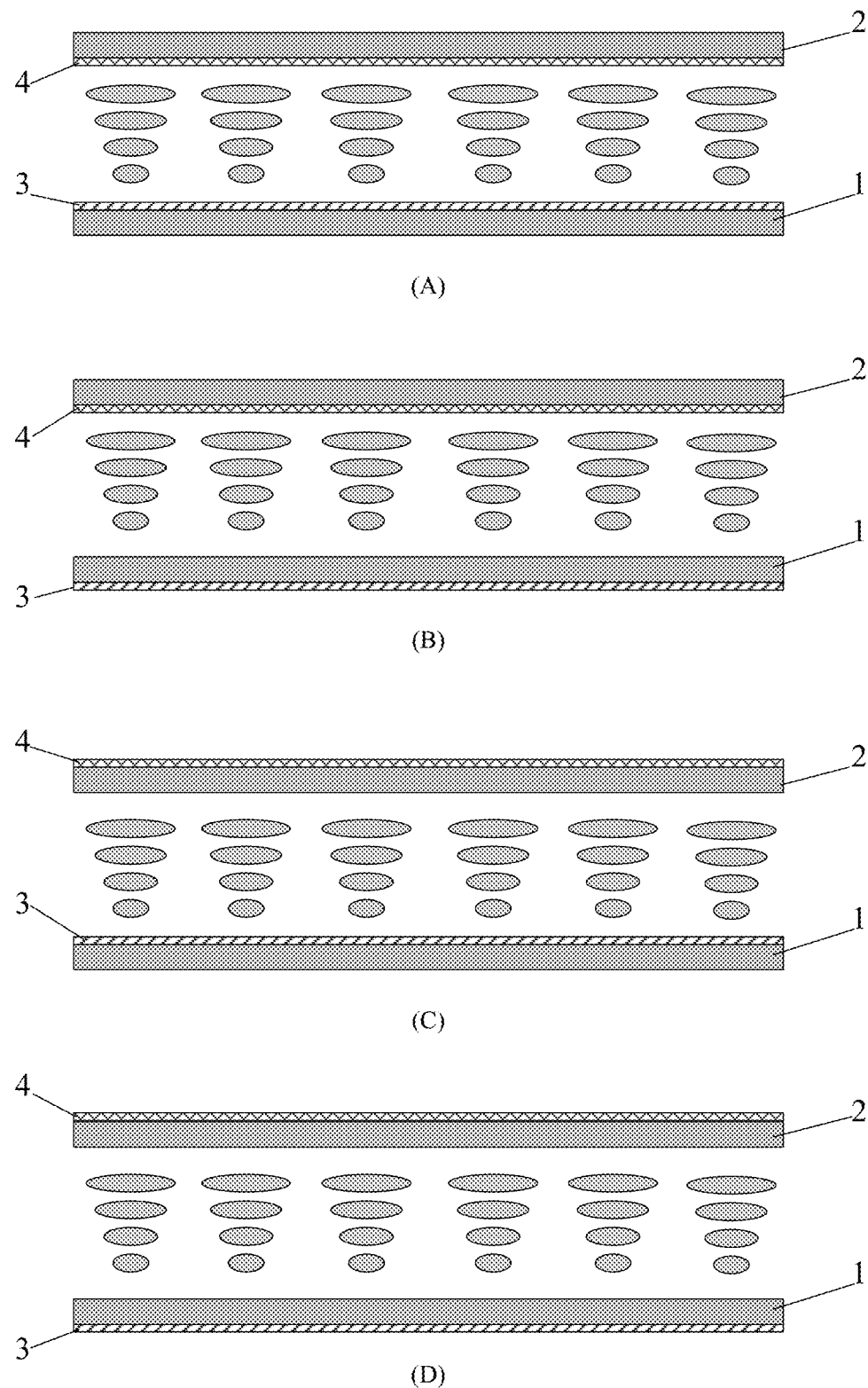

In an embodiment, the display panel may comprise two optical film layers so as to filter out or cut off light in different selected wavelength ranges. FIGS. 14, 15 and 16 schematically show two optical film layers integrated on the array substrate and/or color substrate. Specifically, in embodiments shown in FIGS. 14 to 16, in order to filter out or cut off a secondary color (i.e., yellow light) between the red light and the green light, and a secondary color (i.e., bluish green light) between the green light and the blue light, the optical film layer 3 may be a yellow light cut-off layer, and an optical film layer 4 may be a bluish green light cut-off layer. Through the above described method(s), the yellow light cut-off layer 3 and/or the bluish green light cut-off layer 4 may be integrated on the array substrate 1 and/or the color substrate 2 of the display panel.

In the embodiment shown in FIG. 14, both the yellow light cut-off layer 3 and the bluish green light cut-off layer 4 are integrated on one of the array substrate 1 and the color substrate 2 of the display substrate. In the following, for convenience of description, sides of the array substrate 1 and the color substrate 2 facing the liquid crystal layer are each called as an inner side, and sides of the array substrate 1 and the color substrate 2 facing away from the liquid crystal layer are each called as an outer side. As shown in FIG. 14(A), the yellow light cut-off layer 3 and the bluish green light cut-off layer 4 are integrated on the outer side and the inner side of the array substrate 1 respectively; as shown in FIG. 14(B), the yellow light cut-off layer 3 and the bluish green light cut-off layer 4 are integrated on the inner side and the outer side of the array substrate 1 respectively; as shown in FIG. 14(C), the yellow light cut-off layer 3 and the bluish green light cut-off layer 4 are integrated on the outer side and the inner side of the color substrate 2 respectively; and as shown in FIG. 14(D), the yellow light cut-off layer 3 and the bluish green light cut-off layer 4 are integrated on the inner side and the outer side of the color substrate 2 respectively.

In the embodiment shown in FIG. 15, the yellow light cut-off layer 3 and the bluish green light cut-off layer 4 are integrated on the array substrate 1 and the color substrate 2 of the display substrate respectively. As shown in FIG. 15(A), the yellow light cut-off layer 3 is integrated on the inner side of the color substrate 2, and the bluish green light cut-off layer 4 is integrated on the inner side of the array substrate 1; as shown in FIG. 15(B), the yellow light cut-off layer 3 is integrated on the inner side of the color substrate 2, and the bluish green light cut-off layer 4 is integrated on the outer side of the array substrate 1; as shown in FIG. 15(C), the yellow light cut-off layer 3 is integrated on the outer side of the color substrate 2, and the bluish green light cut-off layer 4 is integrated on the inner side of the array substrate 1; and as shown in FIG. 15(D), the yellow light cut-off layer 3 is integrated on the outer side of the color substrate 2, and the bluish green light cut-off layer 4 is integrated on the outer side of the array substrate 1.

In the embodiment shown in FIG. 16, the yellow light cut-off layer 3 and the bluish green light cut-off layer 4 are integrated on the array substrate 1 and the color substrate 2 of the display substrate respectively. As shown in FIG. 16(A), the yellow light cut-off layer 3 is integrated on the inner side of the array substrate 1, and the bluish green light cut-off layer 4 is integrated on the inner side of the color substrate 2; as shown in FIG. 16(B), the yellow light cut-off layer 3 is integrated on the outer side of the array substrate 1, and the bluish green light cut-off layer 4 is integrated on the outer side of the color substrate 1; as shown in FIG. 16(C), the yellow light cut-off layer 3 is integrated on the inner side of the array substrate 1, and the bluish green light cut-off layer 4 is integrated on the outer side of the color substrate 2; and as shown in FIG. 16(D), the yellow light cut-off layer 3 is integrated on the outer side of the array substrate 1, and the bluish green light cut-off layer 4 is integrated on the outer side of the color substrate 2.

Figure 17:
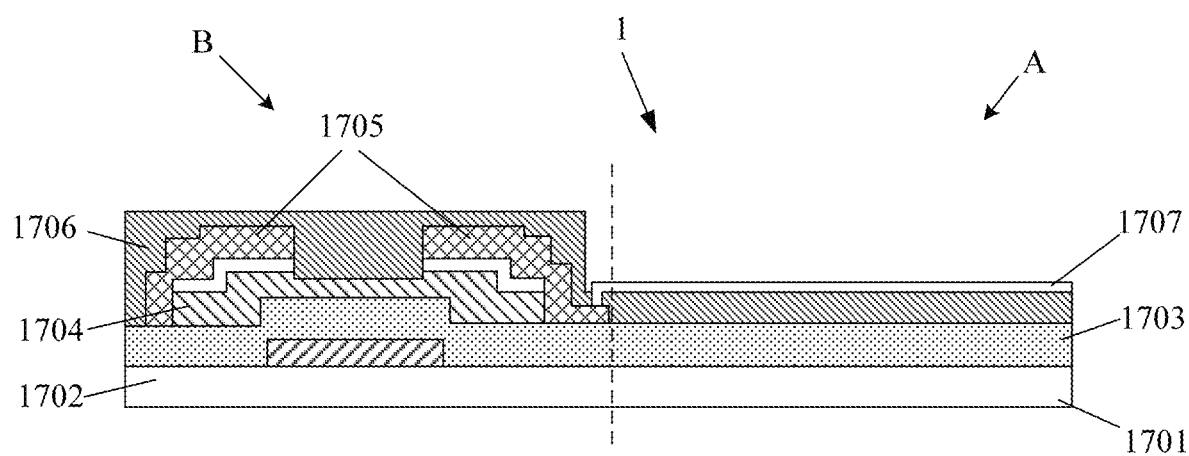
FIG. 17 is a schematic diagram of an array substrate integrated with an optical film layer according to an embodiment of the present disclosure, wherein the optical film layer is formed of a gate insulation layer and a passivation layer formed on the array substrate.

According to an embodiment of the present disclosure, both the two optical film layers may be integrated on the array substrate and are formed into an In-Cell structure, as shown in FIG. 17. The array substrate 1 comprises a base substrate 1701, a gate electrode layer 1702, a gate insulation layer 1703, an active layer 1704, a source/drain layer 1705, a passivation layer 1706 and a pixel electrode layer 1707 arranged successively. In some examples, an ohmic contact layer, such as α-Si layer, may be formed between the active layer 1704 and the source/drain layer 1705, as described above. In this embodiment, each of the gate insulation layer 1703 and the passivation layer 1706 may constitute or be doubled as the optical film layer for filtering out or cutting off light in a selected wavelength range so as to avoid or prevent light in the selected wavelength range from being transmitted through the optical film layer. As an example, the gate insulation layer 1703 and passivation layer 1706 may constitute or be doubled as a yellow light cut-off layer and a bluish green light cut-off layer respectively, for respectively filtering out or cutting off yellow light and bluish green light so as to avoid or prevent yellow light and bluish green light from being transmitted therethrough. As shown in FIG. 17, a pixel structure of the array substrate 1 comprises a display region A and a non-display region B, and in the display region A, the gate insulation layer 1703 and the passivation layer 1706 are successively formed on the base substrate 1701. The gate insulation layer 1703 and the passivation layer 1706 may each be a multilayer film, and by effectively matching layers of films of the multilayer film, for example, by effectively matching parameters such as thickness, material, material refractive index and the like of the layers of films, the gate insulation layer 1703 and the passivation layer 1706 may be rendered with following optical characteristics: in an applicable wave band range, the multilayer film may effectively filter out or cut off light in a particular wavelength range (stop band) (for example, yellow light and bluish green light), while having a good transmittance to light in other wavelength ranges.

In the following, for a display substrate of RGB(red, green, blue)three primary colors, by taking a case of filter outing a secondary color (yellow color) between the red color and the green color and a secondary color (bluish green color) between the green color and the blue color as an example, actions of the optical film layer and the display substrate integrated with the optical film layer designed according to embodiments of the present disclosure in improvement of color gamut will be specifically described.

Referring back to FIG. 4, the optical film layer 3 integrated on the array substrate 1 or on the color substrate 2 is a yellow light cut-off layer, that is, the optical film layer 3 may effectively filter out or cut off yellow light, and has a good transmittance to light in other wavelength ranges.

Generally, optical characteristics of the optical film layer 3 are represented by the light transmittance curve shown in FIG. 3, and the light transmittance curve mainly include three parameters including a spectral band central wavelength, a full width at half maximum, a waveband attenuation intensity(i.e., cutoff rate). Hereinafter, following simulation experiments are made with respect to influences of these parameters on the color gamut.

(1) Influence of Spectral Band Central Wavelength on Color Gamut

Figure 18:
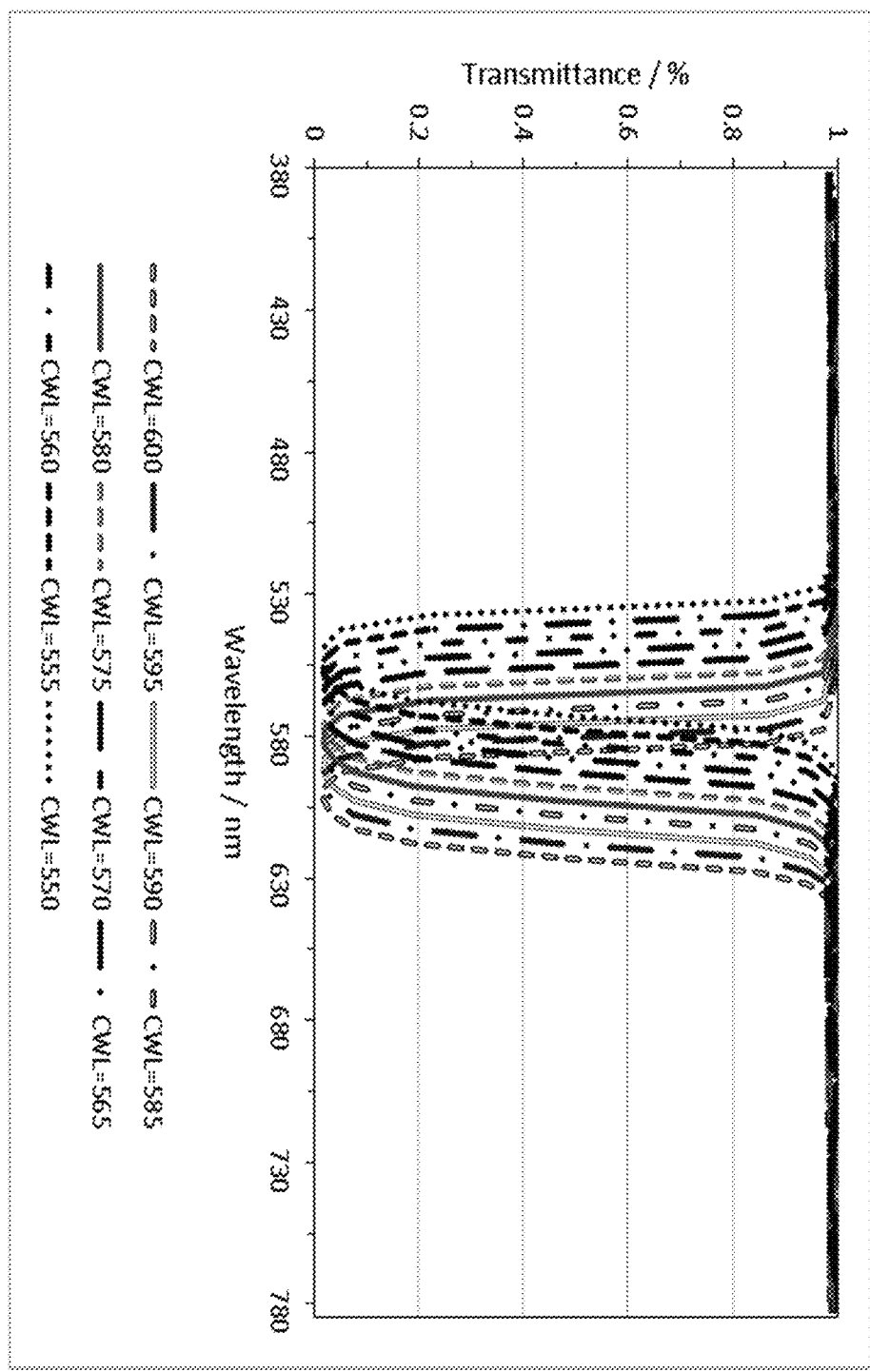
FIG. 18 is a graph showing light transmittance curves of a series of optical film layers according to embodiments of the present disclosure, the series of light transmittance curves having different spectral band central wavelengths.

Firstly, there are designed a series of optical film layers which have light transmittance curves with a full width at half maximum of 35 nm, a spectral cutoff rate of approximately 100% and spectral band central wavelengths of from 550 nm to 600 nm, as shown in FIG. 18. In FIG. 18, the horizontal ordinate represents the spectral band central wavelength (Wavelength) with a unit in nm, and the longitudinal ordinate represents the light transmittance (Transmittance) generally indicated by a percentage.

In an embodiment, silicon oxide and silicon nitride are used to form an optical film layer, that is, the optical film layer comprises a plurality of layers of films formed of silicon oxide ($SiO_2$) and silicon nitride ($SiN_x$). In order to effectively filter out yellow light, it is required to effectively match refractive indexes of the silicon oxide and silicon nitride used, the number of layers of the multilayer film, and thicknesses of the layers of films.

Figure 19:
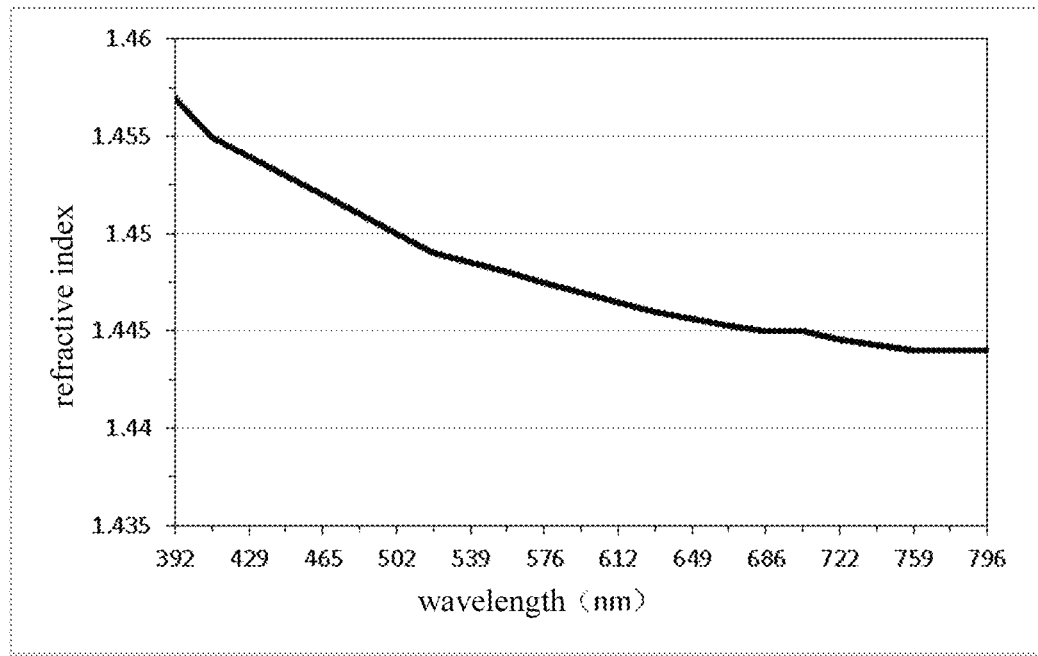
FIG. 19 is a graph showing a refractive index curve of a material for forming the optical film layer having the light transmittance curve shown in FIG. 18.
Figure 20:
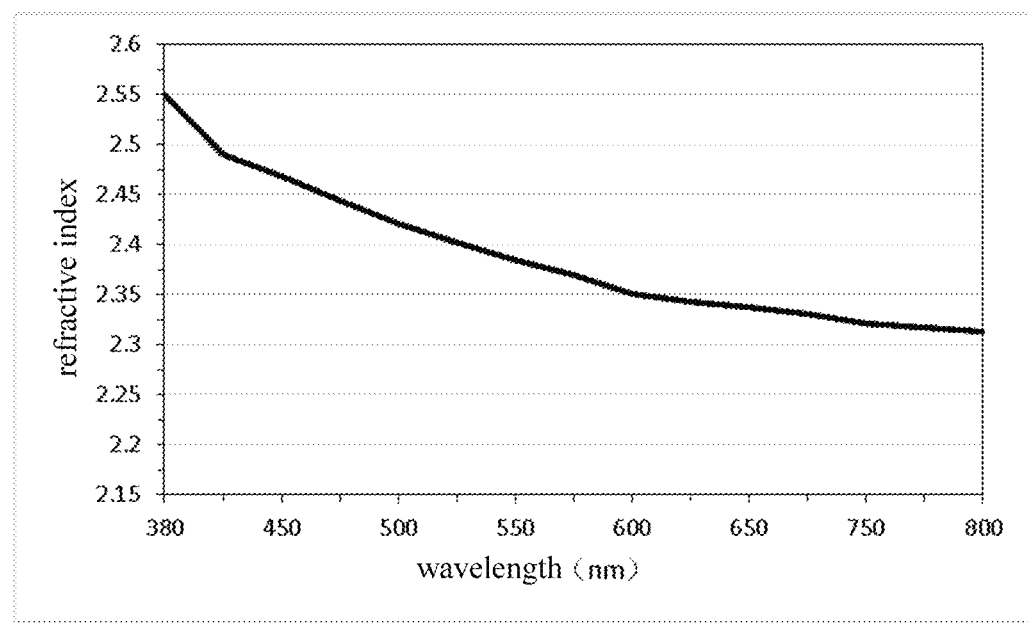
FIG. 20 is a graph showing a refractive index curve of another material for forming the optical film layer having the light transmittance curve shown in FIG. 18.

FIG. 19 and FIG. 20 respectively show refractive index curves of the silicon oxide and the silicon nitride used in this embodiment. In FIGS. 19-20, the horizontal ordinate represents a wavelength of incident light, with a unit in nm, and the longitudinal ordinate represents a refractive index of the material. As shown, in this embodiment, the silicon oxide is used a low refractive index material, while the silicon nitride is used a high refractive index material.

For the number of layers of the multilayer film and the thicknesses of the layers of films, parameters used for filtering out light in a selected wavelength range having a central wavelength of 580 nm are listed in following table 2. As can be seen from the following table, the optical film layer comprises 18 layers of films, which comprise silicon oxide films and silicon nitride films arranged alternately, and the thicknesses of the layers of films are shown in the table 2, where CWL represents the central wavelength.

TABLE 2 parameters of multilayer film
CWL = 580 nm, thicknesses of layers/nm

| $SiN_x$ | $SiO_2$ | $SiN_x$ | $SiO_2$ | $SiN_x$ | $SiO_2$ | $SiN_x$ | $SiO_2$ |
|---|---|---|---|---|---|---|---|
| 26.8 | 32.1 | 28.9 | 35.6 | 27.6 | 35.5 | 24.3 | 33.9 |
| $SiN_x$ | $SiO_2$ | $SiN_x$ | $SiO_2$ | $SiN_x$ | $SiO_2$ | $SiN_x$ | $SiO_2$ |
| 32.6 | 23.4 | 21.3 | 19.2 | 26.4 | 39.5 | 26.4 | 35.6 |
| $SiN_x$ | $SiO_2$ | | | | | | |
| 23.5 | 32.6 | | | | | | |

Similarly, in order to filter out light in selected wavelength ranges having central wavelengths of 550 nm, 555 nm, 560 nm, 565 nm, 570 nm, 575 nm, 585 nm, 590 nm, 595 nm and 600 nm, the number of layers of the multilayer film may be controlled in a range of 16 to 30, and the thicknesses of the layers of films may be controlled in a range of 15 nm to 45 nm.

Figure 21:
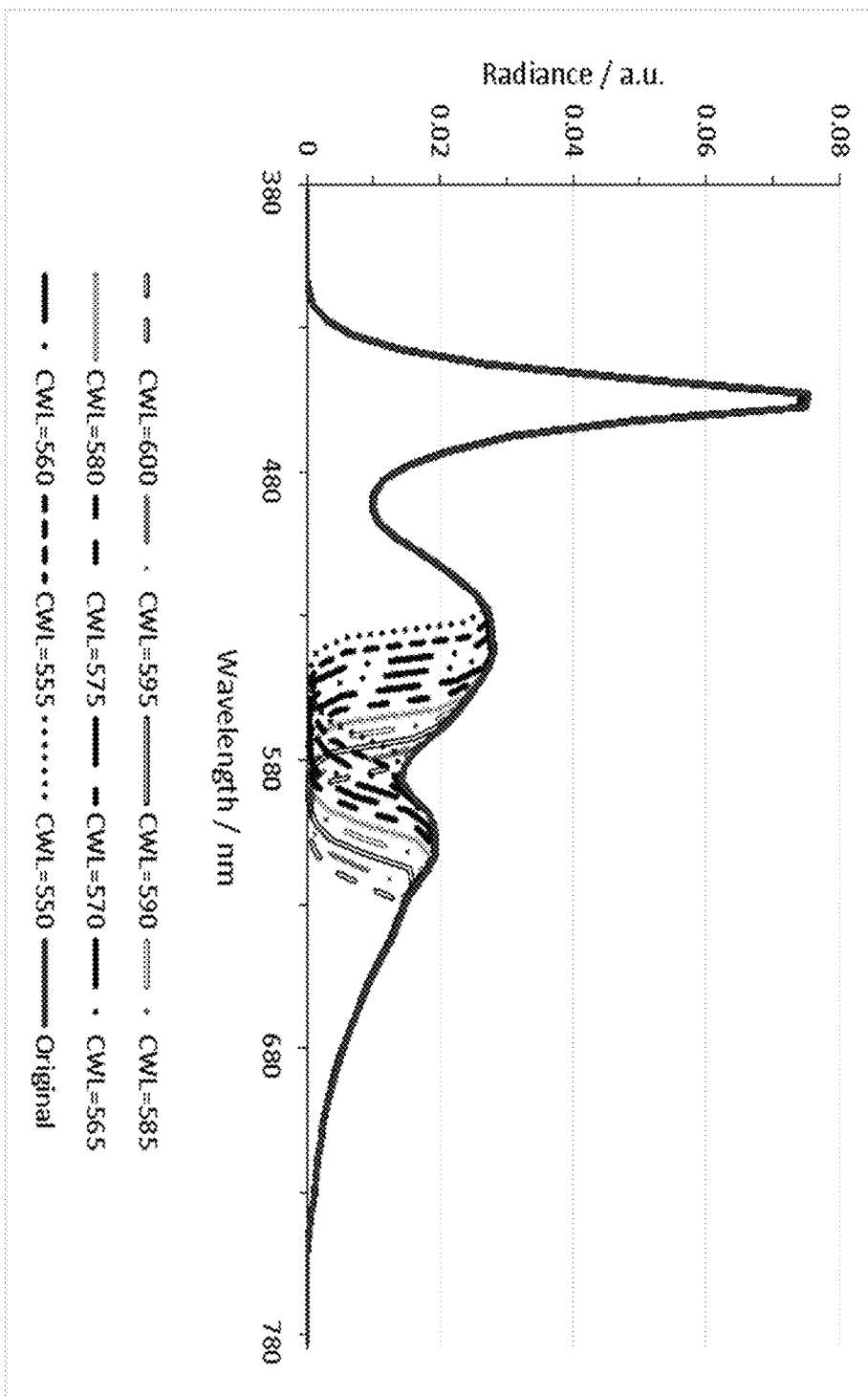
FIG. 21 shows simulation results obtained by applying the series of optical film layers shown in FIG. 18 to a display substrate.

FIG. 21 shows influences of these optical film layers on spectra from the display module. In FIG. 21, the horizontal ordinate represents the wavelength (Wavelength), with a unit in nm, and the longitudinal ordinate represents the radiance (Radiance). FIG. 21 shows that when the optical film layer according to embodiments of the present disclosure is applied to the display device, it can effectively attenuate the yellow light, such that the full widths at half maximum of the red and green spectra become narrower, and the red light and green light can be relatively independently emitted. Taking an optical film layer having a spectral band central wavelength of 580 nm as an example, the full width at half maximum of the green light is narrowed from original 80 nm to 60 nm.

Figure 22:
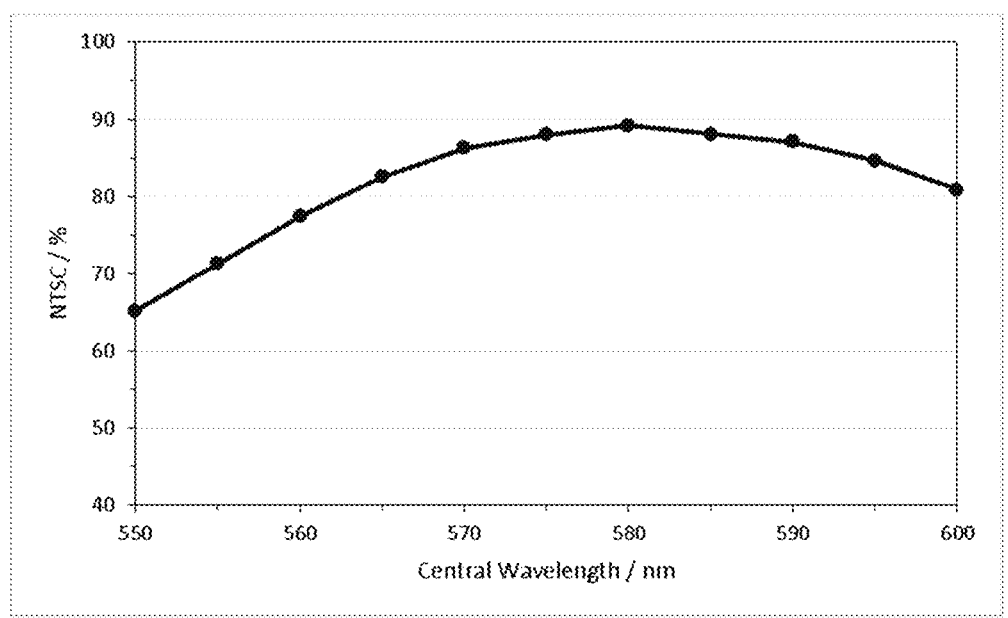
FIG. 22 shows effects of the series of optical film layers shown in FIG. 18 on the color gamut of a module of the display substrate.

Further, influences of these optical film layers on the color gamut of the display device are shown in FIG. 22. In FIG. 22, the horizontal ordinate represents the spectral band central wavelength (Central Wavelength), with a unit in nm, and the longitudinal ordinate represents NTSC color gamut indicated by a percentage. An original gamut of the display device is NTSC 72%, and as can be seen from FIG. 22, when the spectral band central wavelength moves from 550 nm to 600 nm, the color gamut range is firstly increased and then reduced. When the spectral band central wavelength is at 580 nm, the color gamut range is increased from the original NTSC 72% of the module to NTSC 89.18%.

(2) Influence of Full Width at Half Maximum on Color Gamut

Figure 23:
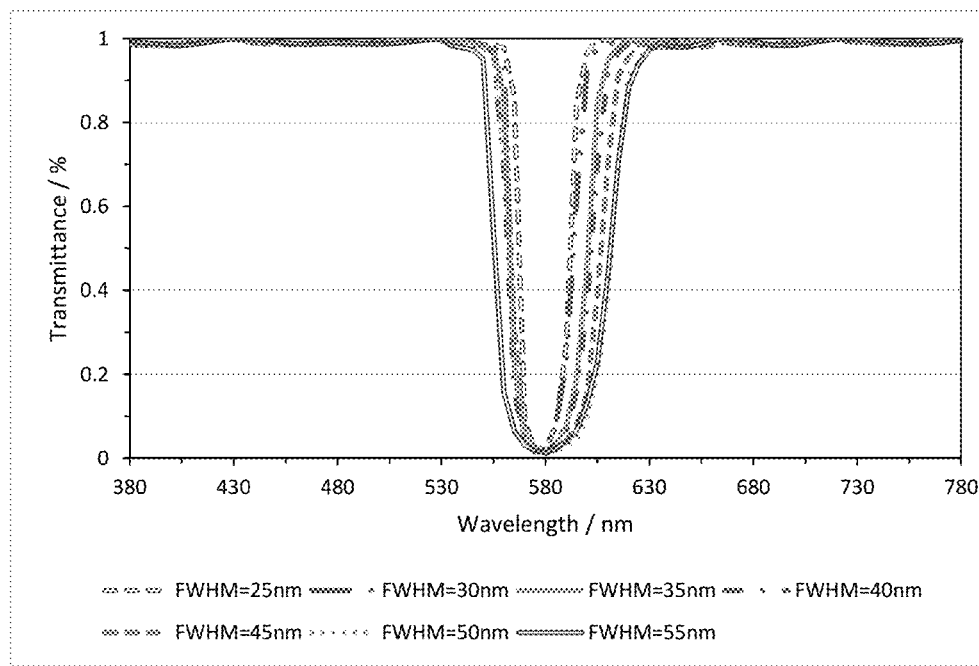
FIG. 23 is a graph showing light transmittance curves of a series of optical film layers according to embodiments of the present disclosure, the series of light transmittance curves having different full widths at half maximum.

Firstly, there are designed a series of optical film layers which have light transmittance curves with a spectral band center of 580 nm, a spectral cutoff rate of approximately 100% and spectral band full widths at half maximum in a range from 25 nm to 55 nm, as shown in FIG. 23. In FIG. 23, the horizontal ordinate represents the wavelength (Wavelength) with a unit in nm, and the longitudinal ordinate represents the light transmittance (Transmittance) or cutoff rate indicated by a percentage.

Similarly, the optical film layer may also comprise a multilayer film formed of silicon oxide and silicon nitride. For the number of layers of the multilayer film and the thicknesses of the layers of films, parameters of an optical film layer having a light transmittance curve with a central wavelength of 580 nm and a full width at half maximum of 25 nm are listed in following table 3. As can be seen from the following table 3, the optical film layer comprises 20 layers of films, and the thicknesses of the layers of films are shown in the following table, where CWL represents the central wavelength and FWHM represents the full width at half maximum.

TABLE 3 parameters of multilayer film
CWL = 580 nm, FWHM = 25 nm, thicknesses of layers/nm

| $SiN_x$ | $SiO_2$ | $SiN_x$ | $SiO_2$ | $SiN_x$ | $SiO_2$ | $SiN_x$ | $SiO_2$ |
|---|---|---|---|---|---|---|---|
| 17.9 | 32.1 | 14.6 | 27.9 | 26.4 | 18.5 | 16.2 | 25.6 |
| $SiN_x$ | $SiO_2$ | $SiN_x$ | $SiO_2$ | $SiN_x$ | $SiO_2$ | $SiN_x$ | $SiO_2$ |
| 14.3 | 25.5 | 16.3 | 23.4 | 22.6 | 27.6 | 18.6 | 20.6 |
| $SiN_x$ | $SiO_2$ | $SiN_x$ | $SiO_2$ | | | | |
| 18.9 | 22.6 | 11.9 | 32.6 | | | | |

Similarly, in cases where the full widths at half maximum are 30 nm, 35 nm, 40 nm, 45 nm, 50 nm and 55 nm respectively, the number of layers of the multilayer film may be controlled in a range of 20 to 50, and the thicknesses of the layers of films may be controlled in a range of 15 nm to 45 nm.

Figure 24:
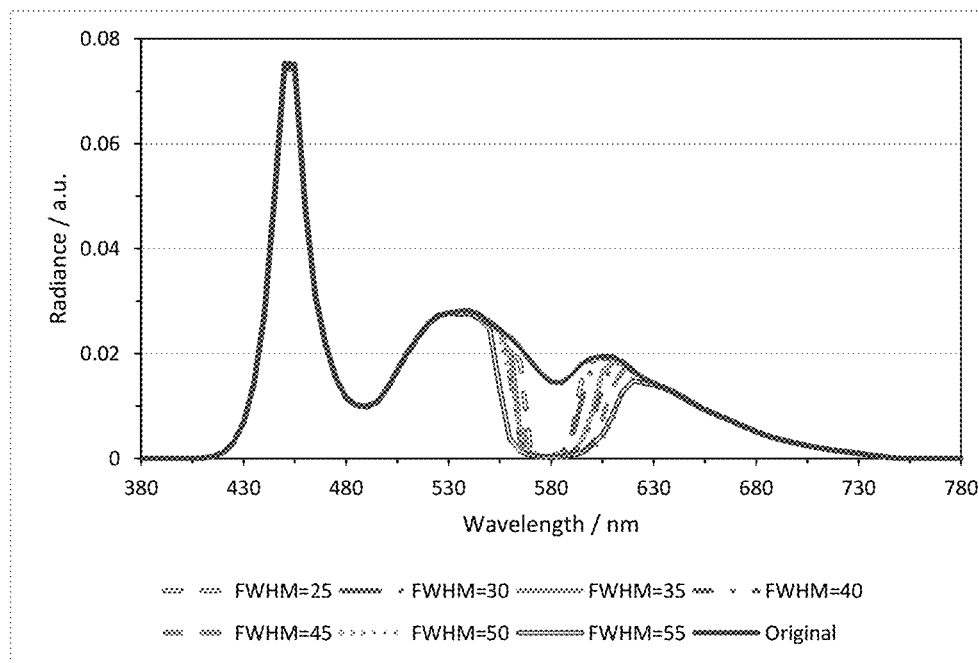
FIG. 24 shows simulation results obtained by applying the series of optical film layers shown in FIG. 23 to a display substrate.

FIG. 24 shows influences of these optical film layers on spectra from the display module. In FIG. 24, the horizontal ordinate represents the wavelength (Wavelength), with a unit in nm, and the longitudinal ordinate represents the radiance (Radiance). FIG. 24 shows that when the optical film layer according to embodiments of the present disclosure is applied to the display device, it can effectively attenuate the yellow light, such that the full widths at half maximum of the red and green spectra become narrower, and the red light and green light can be relatively independently emitted. Taking an optical film layer having a full width at half maximum of 55 nm as an example, the full width at half maximum of the green light is narrowed from original 80 nm to 40 nm.

Figure 25:
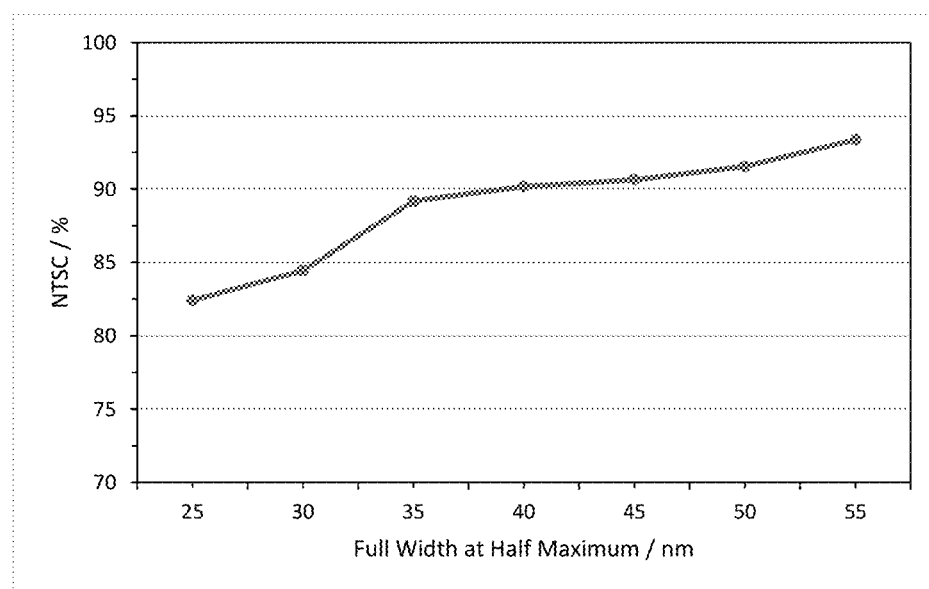
FIG. 25 shows effects of the series of optical film layers shown in FIG. 23 on the color gamut of a module of the display substrate.

Further, influences of these optical film layers on the color gamut of the display device are shown in FIG. 25. In FIG. 25, the horizontal ordinate represents the full width at half maximum (Full Width at Half Maximum), with a unit in nm, and the longitudinal ordinate represents NTSC color gamut indicated by a percentage. An original gamut of the display device is NTSC 72%, and as can be seen from FIG. 25, as the full width at half maximum of the light transmittance curve of the optical film layer increases gradually, the cut-off amount of the yellow light between the green light and the red light becomes larger, so that the full widths at half maximum of the green light and the red light become narrower, and the color gamut gradually increases. In case the full width at half maximum of the light transmittance curve of the optical film layer is 55 nm, the color gamut may reach 93.38%, and the color gamut range is increased by about 21%.

(3) Influence of Cutoff Rate on Color Gamut

Figure 26:
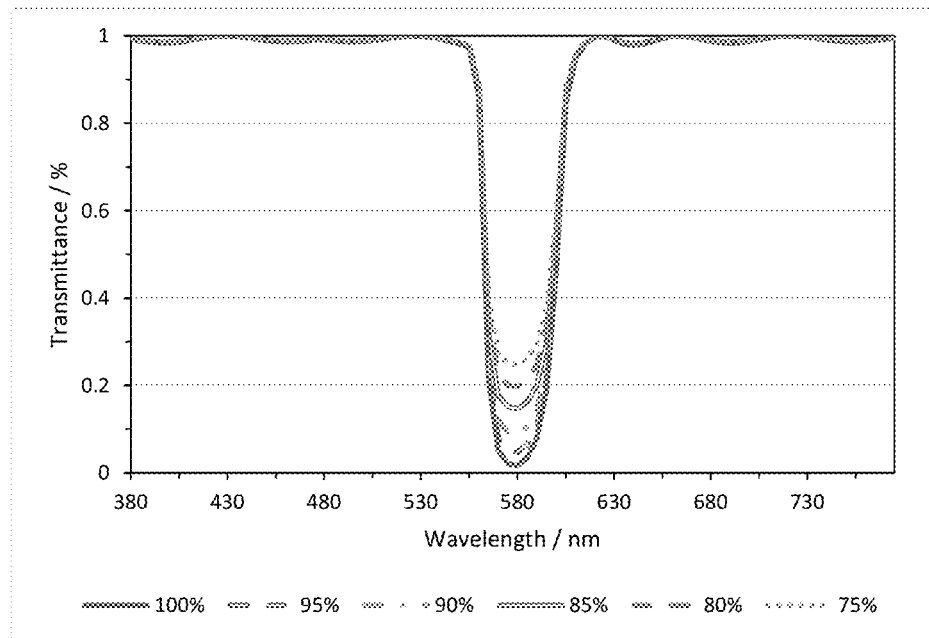
FIG. 26 is a graph showing light transmittance curves of a series of optical film layers according to embodiments of the present disclosure, the series of light transmittance curves having different cutoff rates.

Firstly, there are designed a series of optical film layers which have light transmittance curves with a spectral band center of 580 nm, a full width at half maximum of 35 nm, and yellow light cutoff rates of 100%, 95%, 90%, 85%, 80% and 75%, as shown in FIG. 26, where the horizontal ordinate represents the wavelength (Wavelength) with a unit in nm, and the longitudinal ordinate represents the light transmittance (Transmittance) or cutoff rate generally indicated by a percentage.

Similarly, the optical film layer may also comprise a multilayer film formed of silicon oxide and silicon nitride. For the number of layers of the multilayer film and the thicknesses of the layers of films, parameters of an optical film layer having a light transmittance curve with a central wavelength of 580 nm and a cutoff rate of 90% are listed in following table 4. As can be seen from the following table 4, the optical film layer comprises 18 layers of films, and the thicknesses of the layers of films are shown in the following table, where CWL represents the central wavelength and T represents the cutoff rate.

TABLE 4 parameters of multilayer film
CWL = 580 nm, T = 90%, thicknesses of layers/nm

| $SiN_x$ | $SiO_2$ | $SiN_x$ | $SiO_2$ | $SiN_x$ | $SiO_2$ | $SiN_x$ | $SiO_2$ |
|---|---|---|---|---|---|---|---|
| 24.6 | 31.2 | 28.9 | 35.6 | 27.6 | 35.5 | 22.6 | 35.2 |
| $SiN_x$ | $SiO_2$ | $SiN_x$ | $SiO_2$ | $SiN_x$ | $SiO_2$ | $SiN_x$ | $SiO_2$ |
| 30.5 | 22.5 | 18.9 | 18.2 | 24.5 | 35.6 | 24.5 | 33.8 |
| $SiN_x$ | $SiO_2$ | | | | | | |
| 22.6 | 42.5 | | | | | | |

Similarly, in cases where the cutoff rates are 100%, 95%, 85%, 80% and 75% respectively, the number of layers of the multilayer film may be controlled in a range of 15 to 50, and the thicknesses of the layers of films may be controlled in a range of 15 nm to 45 nm.

Figure 27:
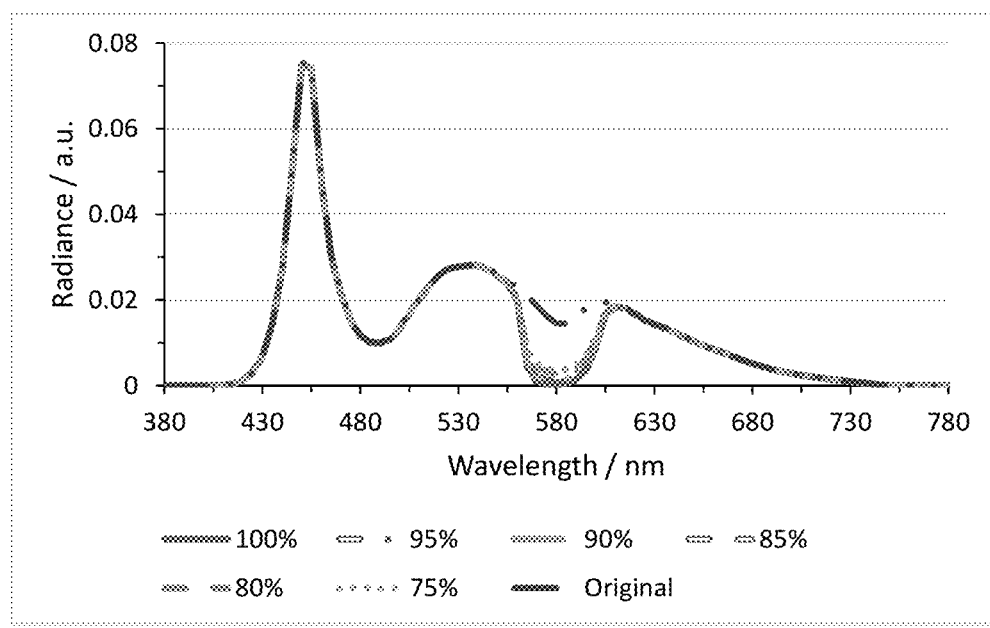
FIG. 27 shows simulation results obtained by applying the series of optical film layers shown in FIG. 26 to a display substrate.

FIG. 27 shows influences of these optical film layers on spectra from the display module. In FIG. 27, the horizontal ordinate represents the wavelength (Wavelength), with a unit in nm, and the longitudinal ordinate represents the radiance (Radiance). FIG. 27 shows that when the optical film layer according to embodiments of the present disclosure is applied to the display device, it can effectively attenuate the yellow light, such that the red light and green light can be relatively independently emitted. As the yellow light cutoff rate gradually decreases, the influences on the full widths at half maximum of the green light and the red light are gradually reduced.

Figure 28:
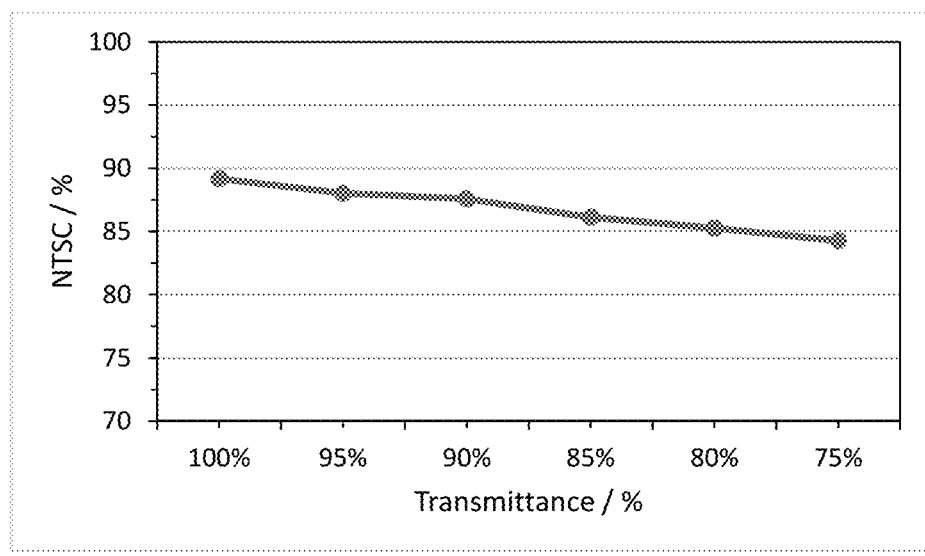
FIG. 28 shows effects of the series of optical film layers shown in FIG. 26 on the color gamut of a module of the display substrate.

Further, influences of these optical film layers on the color gamut of the display device are shown in FIG. 28. In FIG. 28, the horizontal ordinate represents the cutoff rate, and the longitudinal ordinate represents NTSC color gamut indicated by a percentage. An original gamut of the display device is NTSC 72%, and as can be seen from FIG. 28, as the yellow light cutoff rate decreases from 100% to 75%, the color gamut range is reduced from 89.18% to 84.28%. Data shows that in the display module, increase of the yellow light will lead to a reduction in the color gamut.

The above simulation experiments show that: an optical film layer may be used to filter out or cut off light in a particular wavelength range (for example, yellow light), thereby the original color gamut of the display module can be effectively increased. If an appropriate optical film layer is used to attenuate the bluish green light between the blue light and the green light, the green light and the blue light can be emitted independently, which can also achieve the effect of increasing the color gamut. Thus, in an embodiment, the optical film layer may be designed as a bluish green light cut-off layer to filter out the secondary color (i.e., bluish green color) between the blue color and the green color so as to avoid or prevent the bluish green color from being transmitted through the optical film layer. Specifically, as shown in FIG. 4, the optical film layer 3 may also be a bluish green light cut-off layer, that is, the bluish green light cut-off layer may be integrated on the array substrate 1 or on the color substrate 2.

Similar to the above simulation experiments of the yellow light cut-off layer, the following simulation experiments may also be made for a display device having two optical film layers including a yellow light cut-off layer and a bluish green light cut-off layer.

Figure 29:
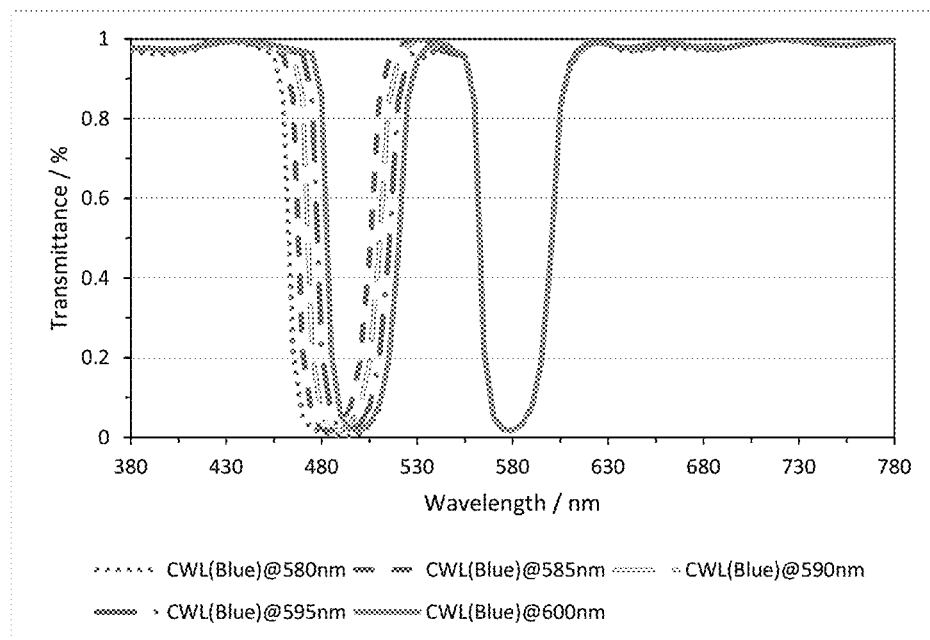
FIG. 29 is a graph showing light transmittance curves of a series of optical film layers according to embodiments of the present disclosure, wherein two optical film layer are formed, and a series of light transmittance curves of one optical film layer have different spectral band central wavelengths.

A series of optical film layers are designed, so that a light transmittance curve of a yellow light cut-off layer has a spectral band central wavelength of 580 nm, a full width at half maximum of 35 nm, and a cutoff rate of approximately 100%, and a light transmittance curve of a bluish green light cut-off layer has a spectral band central wavelength of gradually moving from 480 nm to 500 nm, a full width at half maximum of 35 nm, and a cutoff rate of approximately 100%, as shown in FIG. 29. In FIG. 29, the horizontal ordinate represents the wavelength with a unit in nm, and the longitudinal ordinate represents the light transmittance indicated by a percentage; the "CWL(Blue)" shown in the figure represents the spectral band central wavelength of the light transmittance curve of the optical film layer for cutting off the bluish green light.

Figure 30:
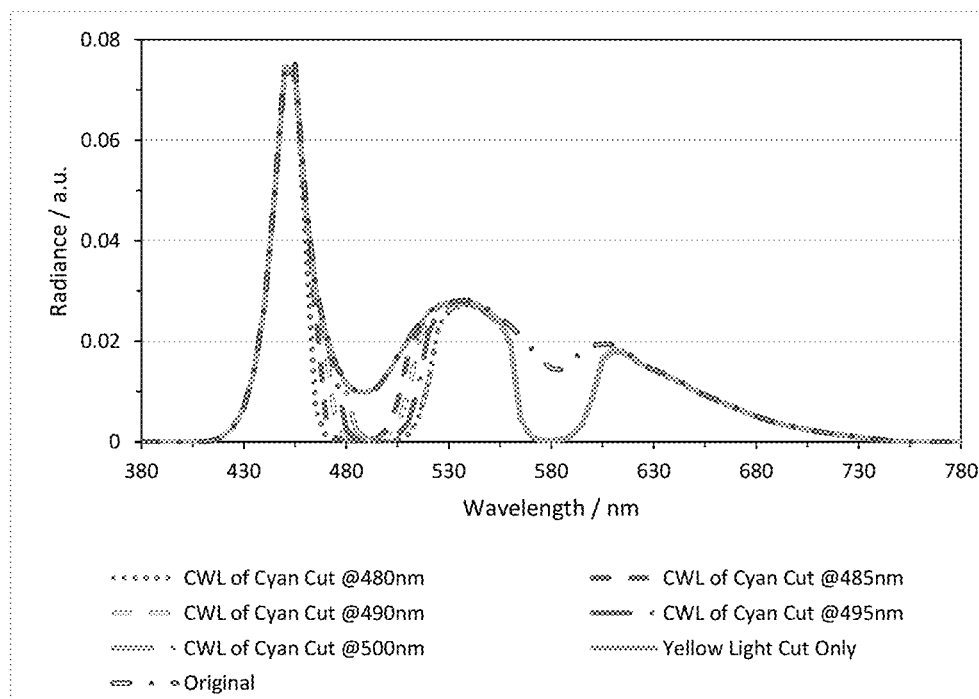
FIG. 30 shows simulation results obtained by applying the series of optical film layers shown in FIG. 29 to a display substrate.
Figure 31:
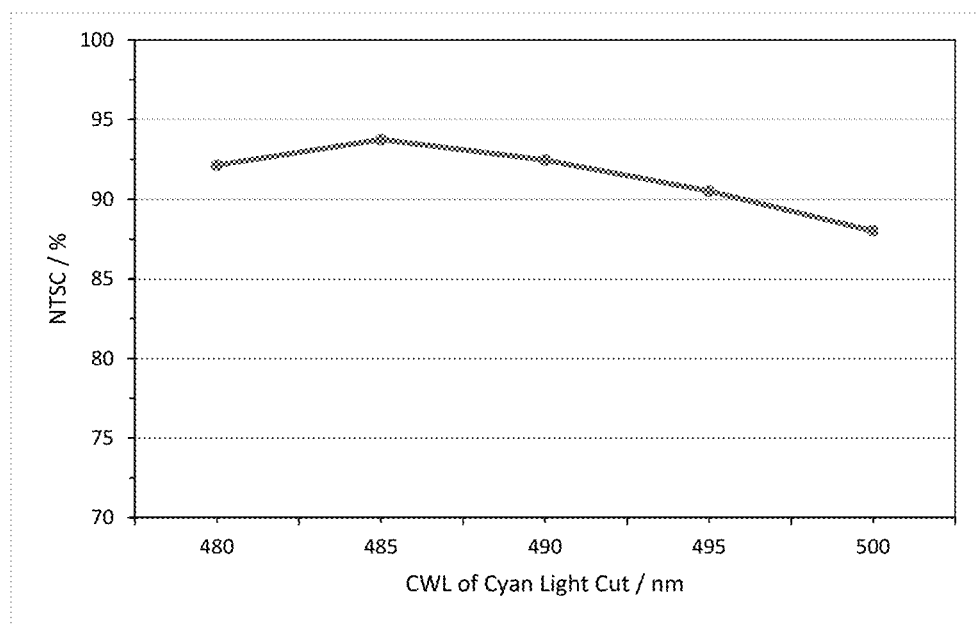
FIG. 31 shows effects of the series of optical film layers shown in FIG. 29 on the color gamut of a module of the display substrate.

FIG. 30 shows influences of these optical film layers on the spectra emitted from the display module. In FIG. 30, the horizontal ordinate represents the wavelength with a unit in nm, and the longitudinal ordinate represents the radiance. Further, influences of these optical film layers on the color gamut of the display device are shown in FIG. 31. An original gamut of the display device is NTSC 72%, and as can be seen from FIG. 30, by further cutting off the bluish green light on basis of cutting off the yellow light, the full width at half maximum of the green light may be further reduced, and the red, green and blue light can be emitted more independently. Influence of moving the spectral band central wavelength of the bluish green light cut-off layer on the color gamut is shown in FIG. 31, where as the spectral band central wavelength moves from 480 nm to 500 nm, the color gamut range of the display module is firstly increased and then reduced. In an example, if the spectral band central wavelength is 485 nm, the color gamut reaches 93.17%, and correspondingly, the color gamut range of the module for only attenuating the yellow light is 88.18%, so that the color gamut is increased by 5%. If a film for cutting off the bluish green light is added on basis of cutting off the yellow light, there is a possibility that the color gamut may reach 100%.

For influences of the full width at half maximum and the cutoff rate on the color gamut, simulation experiments similar to the yellow light cut-off layer may be made and will not be repeatedly described.

As can be seen from the simulation experiments, in embodiments of the present disclosure, the optical film layer, which is configured to filter out or cut off the secondary color (for example, yellow light, bluish green light and the like) between primary colors, is formed on the display substrate, such that the color gamut of the display device may be effectively increased.

In the display substrate and the method of manufacturing the same according to embodiments of the present disclosure, the optical film layer is adapted to be integrated on the display substrate in terms of structure and manufacturing process; further, the optical film layer is adapted to be made of the same material as those of forming the gate insulation layer and the passivation layer, and may be doubled as or also used as the gate insulation layer and the passivation layer, thereby the thickness of the module will not be additionally increased, and the color gamut may be increased by a manufacturing process of a low cost.

Although filtering out or cutting off the yellow light and the bluish green light are only schematically described above, other light of secondary color(s) between the primary colors may also be filtered out or cut off in other embodiments of the present disclosure, so as to effectively improve the color gamut of the display device. Accordingly, although it is described above that only one or two optical film layer(s) are formed on the display substrate, the present disclosure is not limited to this, and more than two optical film layers may be formed on the display substrate.

In the embodiments of the present disclosure, the "primary color" means a color of light emitted from a corresponding sub-pixel of a pixel forming a display panel; for example, for a RGB stripe pixel structure where each pixel is made up of three sub-pixels including a red (R) sub-pixel, a green (G) sub-pixel and a blue (B), the primary colors are red (R), green (G) and blue colors; in another example, for a PenTile RGBW where each pixel is made up of four sub-pixels including a red (R) sub-pixel, a green (G) sub-pixel, a blue (B) and a white (W) sub-pixel, the primary colors are red (R), green (G), blue (B) and white (W) colors; in a further example, for a PenTile RGBG where each pixel is made up of four sub-pixels including a red (R) sub-pixel, a green (G) sub-pixel, a blue (B) and a green (G) sub-pixel, the primary colors are red (R), green (G), blue (B) and green (G) colors. Correspondingly, in the embodiments of the present disclosure, the "light of secondary color between the primary colors" is light having a wavelength in a range between a wavelength range of light emitted by one of sub-pixels of a pixel and a wavelength range of light emitted by another sub-pixel of the pixel adjacent to the one sub-pixel, for example, cyan light having a wavelength between a blue light wavelength range corresponding to the blue sub-pixel and a green light wavelength range corresponding to the green sub-pixel, orange or yellow light having a wavelength between a red light wavelength range corresponding to the red sub-pixel and the green light wavelength range corresponding to the green sub-pixel, or the like. In the embodiments of the present disclosure, the expression "the optical film layer is configured to filter out light of secondary color between primary colors" may mean that the optical film layer is configured to filter out light having wavelength(s) in a wavelength range corresponding to a part or all of secondary colors between the primary colors.

In addition, although the module is described above by taking an RGB display module as an example, the optical film layer according to embodiments of the present disclosure may also applicable to other display modules such as an RGBW display module.

Although some embodiments according to the general concept of the present disclosure have been shown and described, it would be appreciated by those skilled in the art that various changes or modifications may be made in these embodiments without departing from the principles and spirit of the general concept of the disclosure, the scope of which is defined in the claims and their equivalents.

What is claimed is:

1. A display substrate, comprising:
a base substrate; and
an optical film layer formed on the base substrate,
wherein, the optical film layer is configured to filter out light of secondary color between primary colors while allowing light of other wavelength ranges to be transmitted through the optical film layer;
wherein the optical film layer comprises a first optical film layer and a second optical film layer;
wherein, one of the first optical film layer and the second optical film layer is configured to filter out light in a selected wavelength range having a central wavelength of 580 nm and a full width at half maximum in a range from 25 nm to 55 nm, and the other of the first optical film layer and the second optical film layer is configured to filter out light in a selected wavelength range having a central wavelength of 485 nm and a full width at half maximum in a range from 25 nm to 55 nm.

2. The display substrate according to claim 1, wherein the optical film layer comprises a multilayer film comprising at least two material layers which have different refractive indexes.

3. The display substrate according to claim 2, wherein the multilayer film comprises first material layers having a first refractive index and second material layers having a second refractive index, the first material layers and the second material layers being alternately superposed on top of each other.

4. The display substrate according to claim 2, wherein the number of layers of the multilayer film is in a range from 5 to 50.

5. The display substrate according to claim 1, wherein a material forming the optical film layer has a refractive index in a range from 1.2 to 4.

6. The display substrate according to claim 1, wherein the display substrate is an array substrate.

7. The display substrate according to claim 6, wherein the optical film layer is formed from a same material as a gate insulation layer and/or a passivation layer of the array substrate.

8. The display substrate according to claim 6, wherein the array substrate further comprises a gate insulation layer and/or a passivation layer, and the optical film layer is a layer different from the gate insulation layer and/or the passivation layer.

9. The display substrate according to claim 1, wherein the display substrate is a color substrate, and the optical film layer is located at a position corresponding to a selected primary color sub-pixel.

10. The display substrate according to claim 1, wherein wavelength range of the light of secondary color has a central wavelength of 580 nm or 485 nm, and a full width at half maximum in a range from 25 nm to 55 nm.

11. A display panel, comprising an array substrate and a color substrate arranged opposite to each other, wherein, at least one of the array substrate and the color substrate is the display substrate of claim 1.

12. The display panel according to claim 11, wherein the array substrate comprises a first base substrate and the first optical film layer on the first base substrate, and the color substrate comprises a second base substrate and the second optical film layer on the second base substrate.

13. The display panel according to claim 11, wherein, the array substrate comprises a first base substrate, and the first optical film layer and the second optical film layer provided on the first base substrate.

14. A method of manufacturing a display substrate, comprising steps of:
    providing a base substrate; and
    forming an optical film layer on the base substrate,
    wherein the optical film layer is configured to filter out light of secondary color between primary colors while allowing light in of other wavelength ranges to be transmitted through the optical film layer;
    wherein the step of forming an optical film layer on the base substrate comprises:
        forming the optical film layer on the base substrate through a deposition process.

15. The method according to claim 14, wherein the base substrate is a base substrate of an array substrate.

16. The method according to claim 15, wherein the optical film layer is formed from a same material as a gate insulation layer and/or a passivation layer of the array substrate.

17. The method according to claim 15, further comprising a step of:
    forming a gate insulation layer and/or a passivation layer, which is different from the optical film layer, on the base substrate of the array substrate.

18. The method according to claim 14, wherein the base substrate is a base substrate of a color substrate, and the method further comprises a step of: forming a plurality of primary color filters on the base substrate of the color substrate, and
    wherein the step of forming an optical film layer on the base substrate of the color substrate comprises: forming the optical film layer on a selected primary color filter by using a mask; or
    wherein the step of forming an optical film layer on the base substrate of the color substrate comprises: forming the optical film layer on all primary color filters, and etching off, by using an etching process, portions of the optical film layer on other primary color filters except the selected primary color filter so as to remain a portion of the optical film layer on the selected primary color filter.

* * * * *